(12) United States Patent
Siddiqui

(10) Patent No.: US 6,256,013 B1
(45) Date of Patent: *Jul. 3, 2001

(54) COMPUTER POINTING DEVICE

(75) Inventor: Kabir Siddiqui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/179,276

(22) Filed: Oct. 26, 1998

Related U.S. Application Data

(63) Continuation of application No. 08/367,938, filed on Jan. 3, 1995, now Pat. No. 5,828,364.

(51) Int. Cl.⁷ .................................................. G09G 5/08
(52) U.S. Cl. ........................... 345/163; 345/164; 341/20; 341/22
(58) Field of Search .................................. 345/163, 164; 341/20, 22

(56) References Cited

U.S. PATENT DOCUMENTS

| | | | |
|---|---|---|---|
| Re. 32,633 | 3/1988 | Hovey et al. | 340/710 |
| 3,731,014 | 5/1973 | Brady | 200/5 A |
| 3,987,685 | 10/1976 | Opocensky | 74/471 R |
| 4,210,380 | 7/1980 | Brzostek | 339/107 |
| 4,464,652 | 8/1984 | Lapson et al. | 340/710 |
| 4,544,811 | 10/1985 | Brevick | 200/5 R |
| 4,562,314 | 12/1985 | Hosogoe et al. | 200/5 R |
| 4,562,347 | 12/1985 | Hovey et al. | 354/163 |
| 4,594,586 | 6/1986 | Hosogoe | 340/710 |
| 4,613,853 | 9/1986 | Hosogoe et al. | 340/710 |
| 4,739,315 | 4/1988 | Soma et al. | 340/710 |
| 4,786,892 | 11/1988 | Kubo et al. | 340/365 R |
| 4,952,919 | 8/1990 | Nippoldt | 340/710 |
| 5,064,967 | 11/1991 | Singbartl | 174/52.3 |
| 5,268,674 | 12/1993 | Howard et al. | 345/163 |
| 5,355,146 | 10/1994 | Chiu et al. | 354/163 |
| 5,528,265 | 6/1996 | Harrison | 345/163 |
| 5,635,926 * | 6/1997 | Li | 345/163 |
| 5,661,504 * | 8/1997 | Lo | 345/164 |
| 5,790,098 * | 8/1998 | Lin | 345/163 |
| 5,828,364 * | 4/2000 | Siddiqui | 345/163 |
| 5,963,197 * | 10/1999 | Bacon et al. | 345/163 |
| 6,054,978 * | 4/2000 | Perry | 345/163 |

FOREIGN PATENT DOCUMENTS

| | | |
|---|---|---|
| 3632831 | 4/1987 | (DE) . |
| 0508614 | 10/1992 | (EP) . |

* cited by examiner

Primary Examiner—Richard Hjerpe
Assistant Examiner—Ali Zamani
(74) Attorney, Agent, or Firm—Banner & Witcoff, Ltd.

(57) ABSTRACT

A case top for the housing of a mouse-type computer pointing device is made of a single piece of plastic. The case top includes securing arms which engage securing hooks extending from a case bottom of the housing, allowing the case top to be releasably fastened to the case bottom with a single screw. The case top includes two user actuable buttons attached to a main body by two spring arms, all formed as a single one-piece case top. The two buttons actuate an integrated switch package having two momentary switches within the package. The integrated switch package consists of two pieces: a switch case and a switch spring. The switch package is mounted on a printed circuit board. The switch case engages the case bottom to help secure both the switch package and the printed circuit board. User actuation of the switch package causes the switch spring to flex and make momentary electrical contact with contacts on the printed circuit board. The pointing device includes a cord strain relief unit that is held solely by the case bottom. The pointing device also includes a ball retaining cage that is removably securable to the bottom side of the housing while the case top and case bottom are secured together.

29 Claims, 16 Drawing Sheets

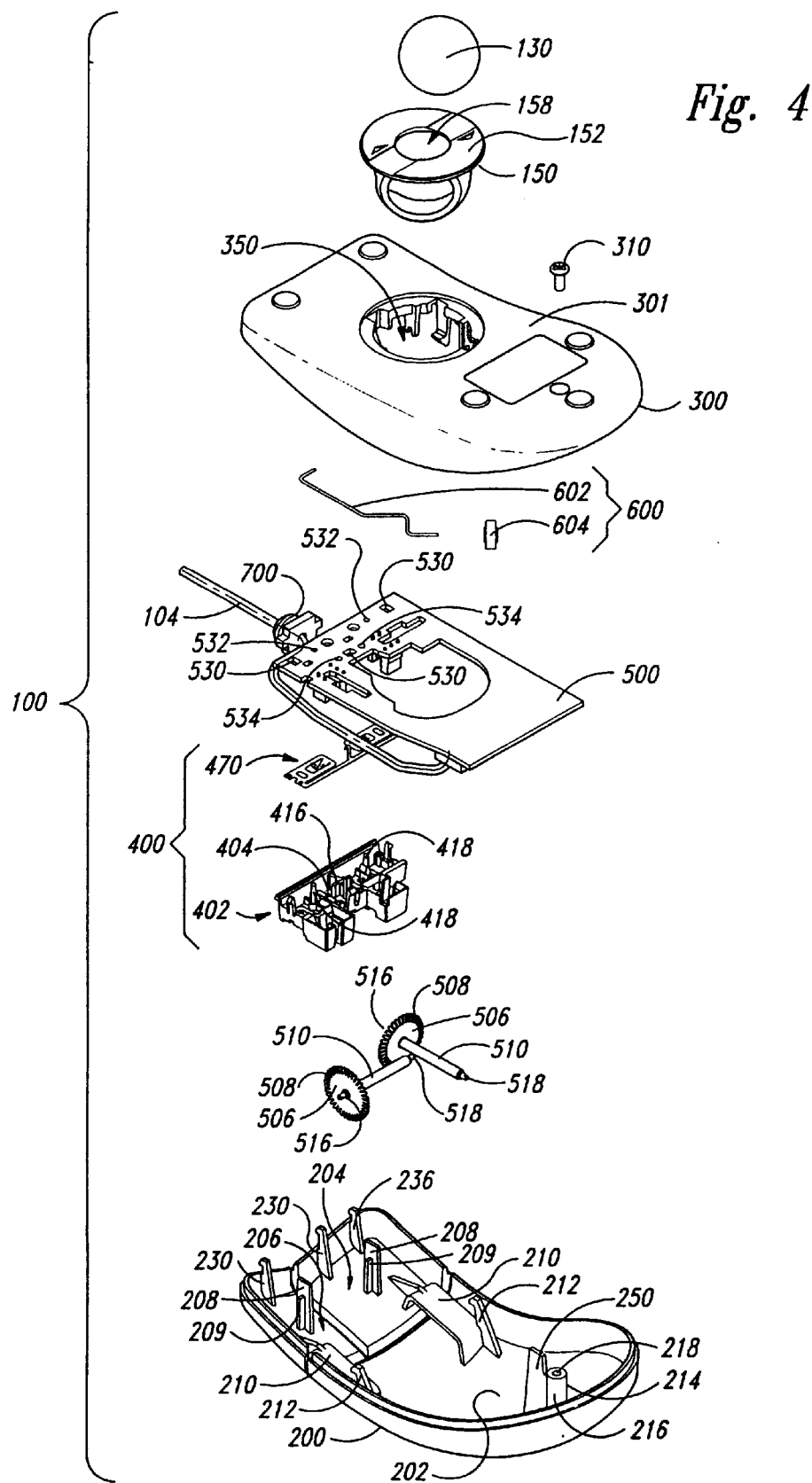

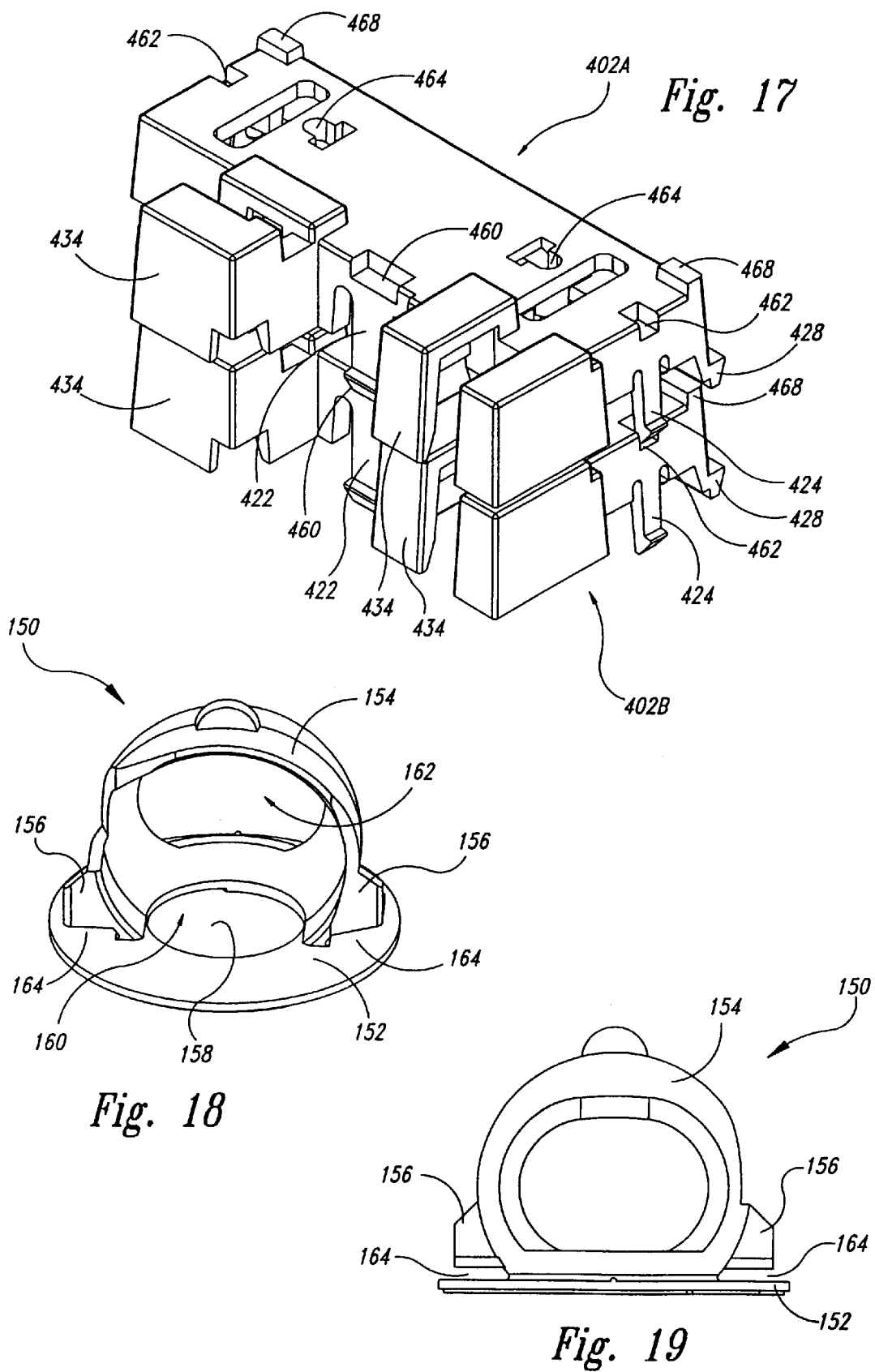

COMPUTER POINTING DEVICE

CROSS REFERENCE TO RELATED APPLICATION

This application is a continuation of U.S. patent application Ser. No. 08/367,938, filed Jan. 3, 1995, now U.S. Pat. No. 5,828,364.

TECHNICAL FIELD

This invention relates generally to computer pointing devices and, more particularly, to ball-type pointing devices.

BACKGROUND OF THE INVENTION

In many of today's computers, commands are entered into the computer by using a mouse pointing device. Typically, the mouse includes a housing partially enclosing a rotatable ball and one or more depressable buttons. As the mouse is moved along a surface, oftentimes a table top, transducers within the mouse sense the ball's rotation and generate signals output to the computer. The signals control a corresponding movement of a cursor, or pointer, on a visual display of the computer. Depending upon the location of the cursor on the visual display, a variety of commands can be entered into the computer by depressing the buttons and actuating switches positioned within the housing. Examples of such commands include launching an application program, pulling down a menu, opening a document, selecting a portion of a document for editing, and creating terminal or other points in a graphic pattern on the visual display.

Today's commercially available mice are assembled from a relatively large number of pieces. Generally, the greater the number of parts in a mouse the more expensive it is to produce. This is because both the number of manufacturing and assembly steps increase with the increasing number of parts. For example, most of today's mice have an upper housing, or case top, assembled from at least two pieces, with the buttons being formed from a separate piece that must be attached to the rest of the case top. While one-piece case top mice are currently available on the market, they require additional pieces within the housing to accommodate the one-piece case top design, and so there is no overall parts reduction. Also, the currently available one-piece piece case top mice have an unsatisfactory limitation on button movement. Currently available mice have the upper and lower parts of the housing fastened together by two or more screws. Currently available mice have switches assembled from a number of separate pieces. Currently available mice have a multi-piece means of biasing the ball against transducers.

Overall, it is desirable to design a mouse pointing device that can be manufactured from as few pieces and in as few manufacturing and assembly steps as possible, without sacrificing the requisite operating characteristics and durability.

SUMMARY OF THE INVENTION

According to the principles of the present invention, a computer input device includes a housing formed from a case bottom and a case top. The case top is of unitary construction and includes a main body and a first button movable between rest and actuation positions for user actuation of a first switch. A first spring arm, extending from the main body to approximately a middle portion of the first button, biases the first button into the rest position. A first guide track protruding from the case bottom receives a first restraining arm extending from the first button and restricts the lateral, torsional and upward movement of the first restraining arm and the first button attached thereto. Preferably, the case top of the input device of the present invention includes a second button movable between rest and actuation positions, a second spring arm extending from the main body to the second button and biasing the second button into the rest position, and a second restraining arm extending from the second button and received by a second guide track protruding from the case bottom. The case top further includes securing arms which engage securing hooks projecting from the case bottom, allowing the case top to be releasably fastened to the case bottom with a single selectively removable fastener.

The computer input device of the present invention further includes a switch package consisting of a switch case of unitary construction and a switch spring of unitary construction. The switch spring is positioned within a recess of the switch case, and the switch package is mounted on a printed circuit board positioned within the housing of the input device. The case top includes first and second actuating members respectively projecting from the first and second buttons and. Upon user actuation of the first and second buttons, the first and second actuating members respectively contact and flex the switch spring to make first and second electrical connections between the switch spring and first and second contacts on the circuit board. The switch case engages the case bottom of the housing, securing the switch package to the case bottom and helping to secure the printed circuit board within the housing.

BRIEF DESCRIPTION OF THE DRAWINGS

FIG. 4 is an exploded bottom perspective view of the mouse pointing device of FIG. 1.

FIG. 17 is a rear perspective view of the switch case of FIG. 11 shown stacked on another switch case.

FIG. 18 is an enlarged perspective view of a ball retaining cage used in the mouse pointing device of FIG. 1.

FIG. 19 is an elevational view of the ball retaining cage of FIG. 18.

DETAILED DESCRIPTION

Figure 1:
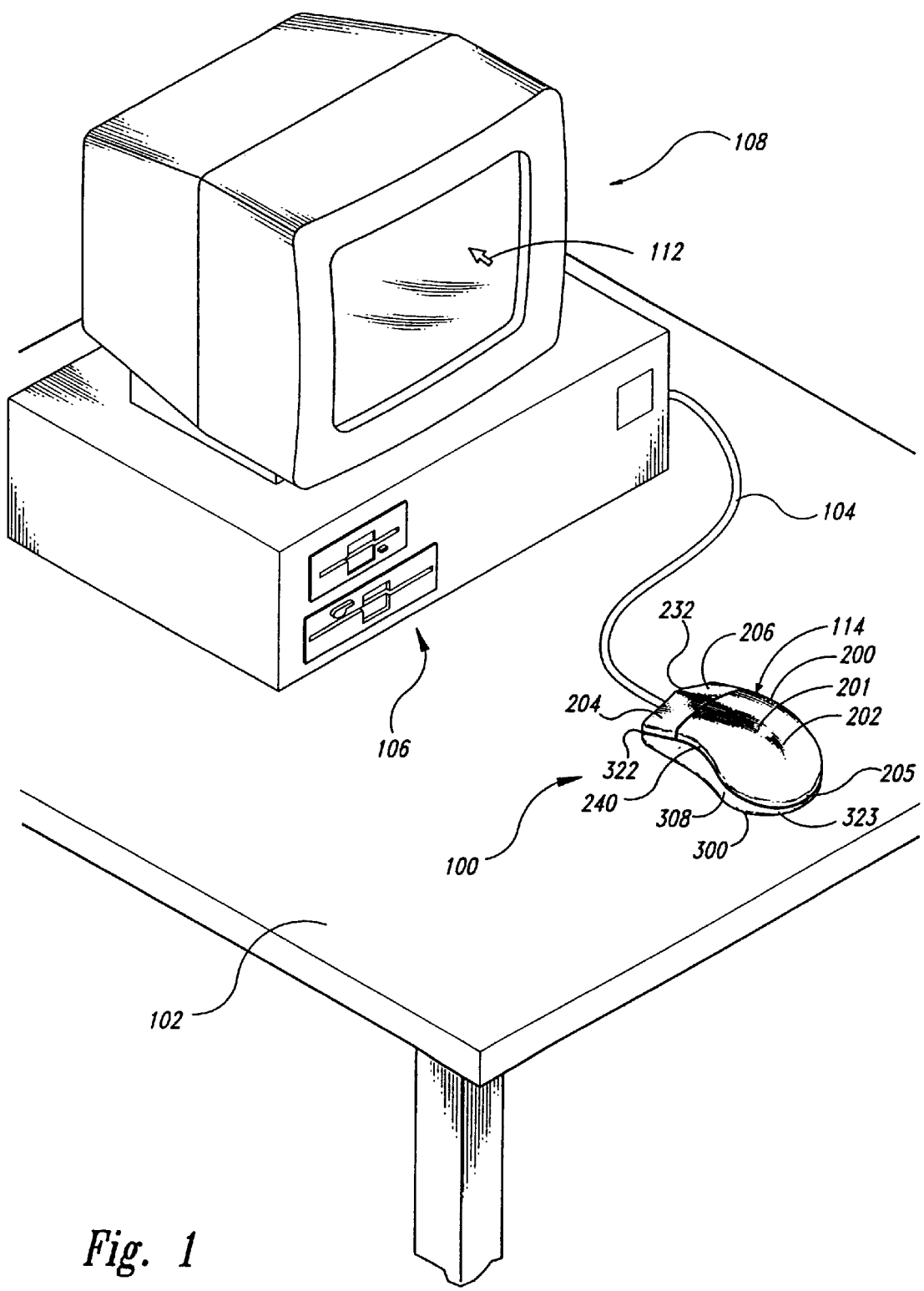
FIG. 1 shows a mouse pointing device of the present invention on a table top connected to a computer having a visual display.

FIG. 1 shows a mouse 100 of the present invention resting on and free to move along a tabletop horizontal surface 102. The mouse 100 is connected by a cord 104 to a computer 106 having a visual display 108. Transducers 110 (see FIG. 3) within the interior of the mouse 100 translate motion of the mouse along the horizontal surface 102 into a corresponding motion of a cursor 112 on the visual display 108.

Figure 2:
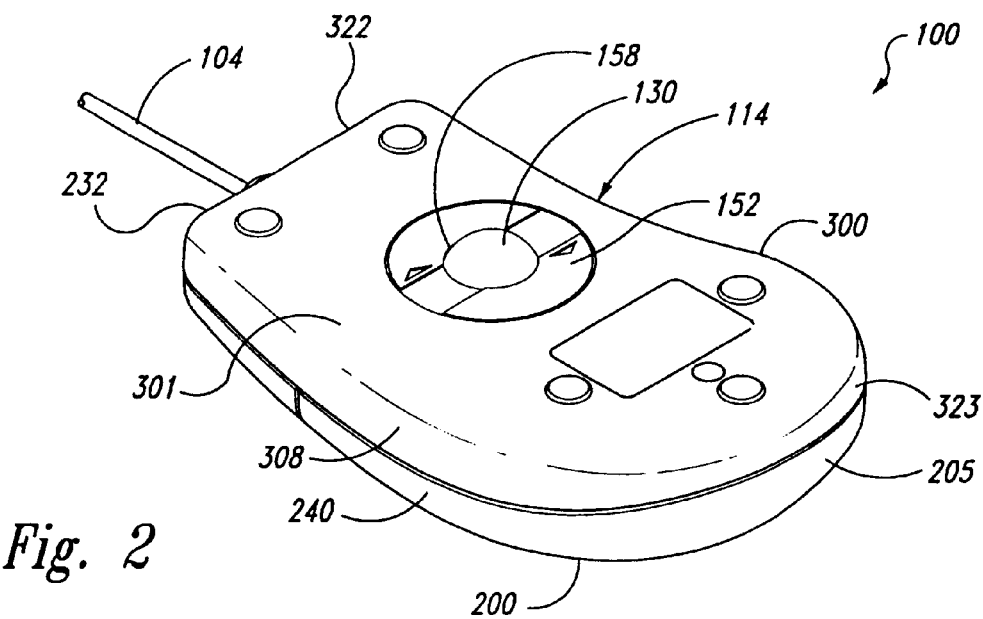
FIG. 2 is an enlarged bottom perspective of the mouse pointing device of FIG. 1.

As shown in FIG. 1 and 2, the mouse 100 includes a housing 114 formed from a case top 200 and a case bottom 300. Each of the case top 200 and case bottom 300 is of unitary construction, with each of their respective assembly of components described below being molded as an integral unit. The case top 200 and the case bottom 300 are each preferably constructed from ABS plastic. A top sidewall 201 of the case top 200 defines a top side of the housing 114, and a bottom sidewall 301 of the case bottom 300 defines a bottom side of the housing. Left and right sidewalls 240 of the case top 200 and left and right sidewalls 308 of the case bottom 300 together respectively define left and right sides of the housing 114. A curved rear sidewall 205 of the case top 200, together with a curved rear sidewall 323 of the case bottom 300, define a curved rear side of the housing 114. A front sidewall 232 of the case top 200 (see FIG. 5) and a front sidewall 322 of the case bottom 300 (see FIG. 6) together define a front side of the housing 114. The case top 200 and case bottom 300 together define an interior compartment within the housing 114.

As shown in FIG. 2, the housing 114 of the mouse 100 partially encloses a ball 130, which rests in a middle portion of the case bottom 300 and protrudes through a hole 158 in the bottom side of the housing. As the mouse 100 is moved along the horizontal surface 102 of FIG. 1, the horizontal surface contacts and rotates the ball 130. Transducers 110 (see FIG. 3) within the interior compartment of the mouse 100 translate the rotation of the ball 130 into movement of the cursor 112 on the visual display 108 of the computer 106.

Figure 3:
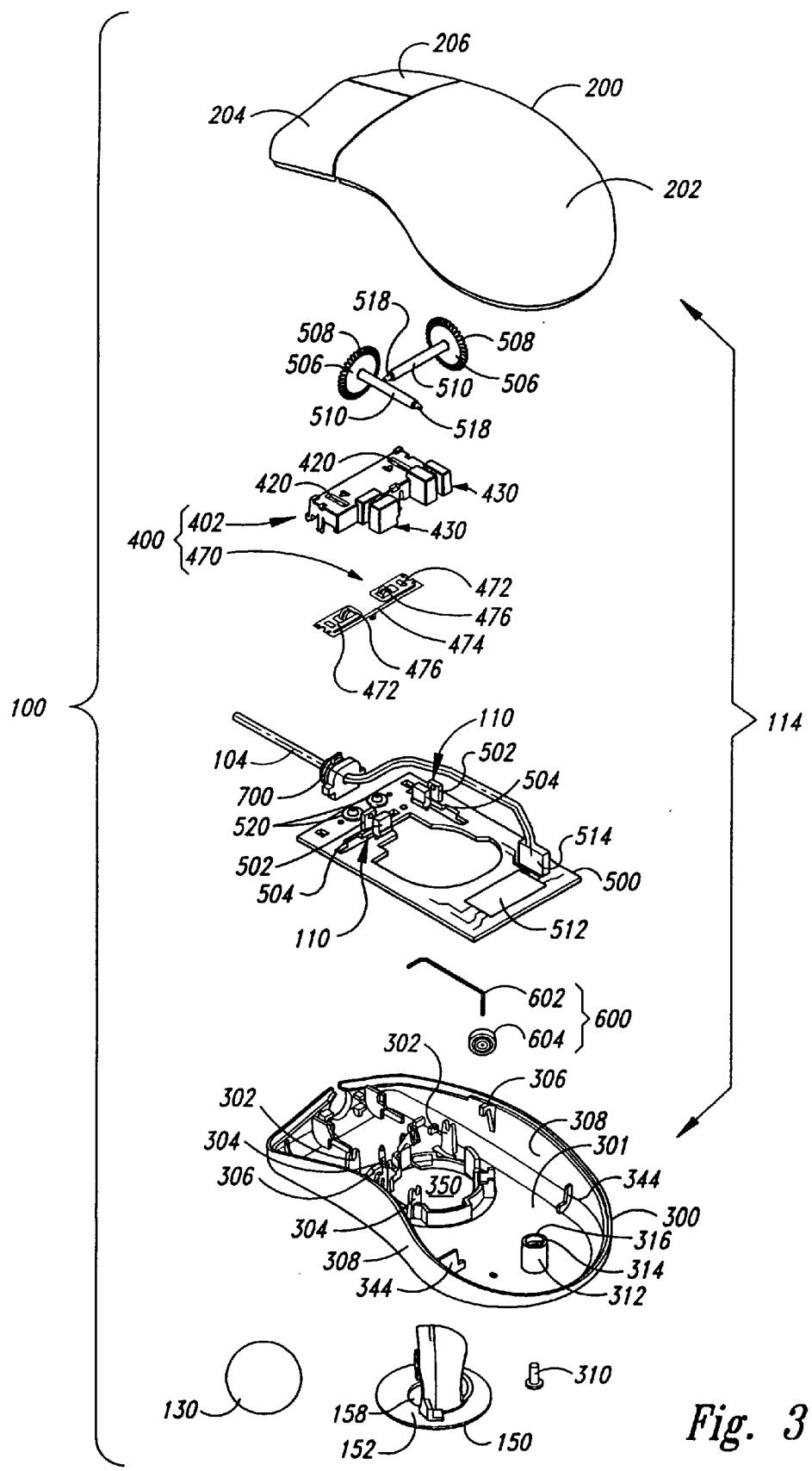
FIG. 3 is an exploded top perspective view of the mouse pointing device of FIG. 1.

The main components of the mouse 100 are shown in FIGS. 3 and 4. A retaining cage 150 receives the ball 130 therewithin and is removably secured to the case bottom 300. The retaining cage 150 allows the ball 130 to rotate freely while protecting the components within the mouse 100 from the ball in the event the mouse is dropped or moved suddenly. For a more detailed description of the retaining cage 150 and its securement to the case bottom 300, see FIGS. 6, 18 and 19, and the discussion below.

A biasing spring unit 600, consisting of a selectively bent spring rod or wire spring 602 and a roller 604, is positioned within the interior of the housing 114 of the mouse 100. The wire spring 602 is preferably constructed from a small diameter stainless steel rod, and the roller 604 is preferably constructed from Acetal. The case bottom 300 secures or supports each end portion of the wire spring 602, and the roller 604 is rotatably disposed on one end portion of the wire spring. The roller 604 rotatably contacts the ball 130, and is biased against the ball by the wire spring 602, for coupling the ball to the transducers 110. For a more detailed description of the biasing spring unit 600, its positioning within the interior of the housing 114 and its functioning to couple the ball 130 to the transducers 110, see FIGS. 7, 20, 21 and 23, and the discussion below.

As shown in FIG. 3, a printed circuit board 500 is positioned within the housing 114 of the mouse 100. Mounted on the printed circuit board 500 are two transducers 110, each including a paired light-emitting element or diode ("LED") 502 and light-detecting element or photodetector 504. A notched encoder wheel 506 is positioned between each paired LED 502 and photodetector 504. Each encoder wheel 506 is axially mounted on an encoder shaft 510 which is rotatably supported by a wheel support arm 302 and a shaft support arm 304 which extend upwardly from the interior side of the bottom sidewall 301 of the case bottom 300. The biasing spring unit 600 biases the ball 130 against both of the encoder shafts 510, and as the ball rotates, the shafts turn accordingly (see FIG. 21). Notches 508 on the rotating encoder wheels 506 sweep by the LEDs 502, selectively modulating the light received by the photodetectors 504 which output signals in response thereto.

Control circuitry 512 on the printed circuit board 500 processes the signals output by the photodetectors 504 and then sends to the computer 106 (see FIG. 1), via the cord 104, signals controlling the direction and distance of cursor 112 movement on the visual display 108. The circuitry 512 is connected by a coupler 514 to the cord 104. A strain relief unit 700 grasps the cord 104 and is secured to the case bottom 300 to assure that mechanical strain on the cord is transmitted to the case bottom and not to the coupler 514. For a more detailed description of the strain relief unit 700 and its securement to the case bottom, see FIGS. 20, 24 and 25, and the discussion below.

A switch package 400, consisting of only a switch case 402 having an interior recess 404 and a switch spring 470 positioned within the interior recess of the switch case, is mounted on top of the printed circuit board 500. Each of the switch case 402 and switch spring 470 is of unitary construction, with each of their respective assembly of components described below being formed as an integral unit. The switch case 402 is preferably constructed from polycarbonate, and the switch spring 470 is preferably constructed from beryllium-copper. The switch case 402 includes two photoelectric housing units 430 which position and align the transducers 110, as well as cover them for protection from ambient light and dust.

As shown in greater detail in FIGS. 13 and 15 and as described in further detail below, the interior recess 404 has an opening at the bottom of the switch case 402 so that the switch spring 470 positioned therein can engage the printed circuit board 500. Left and right contact leaves 472 of the switch spring 470 selectively and momentarily make electrical contact with left and right contacts 520 mounted on the printed circuit board. The contacts 520 are positioned below the contact leaves 472 and connected to the circuitry 512 on the printed circuit board 500. The contacts 520 are also held in place by an arm 416 extending from within the recess 404 of the switch case 402.

The shape of the left and right portions of the switch spring 470 is substantially symmetrical. As shown in greater detail in FIGS. 13–16 and as described in further detail below, the switch spring 470 includes left and right C-shaped leaf spring elements 476 that, in the rest position of the switch spring, bias the contact leaves 472 away from the contacts 520 on the printed circuit board 500. The switch spring 470 further includes a common contact ribbon 474 which is fixedly and electrically connected to the printed circuit board 500.

Figure 5:
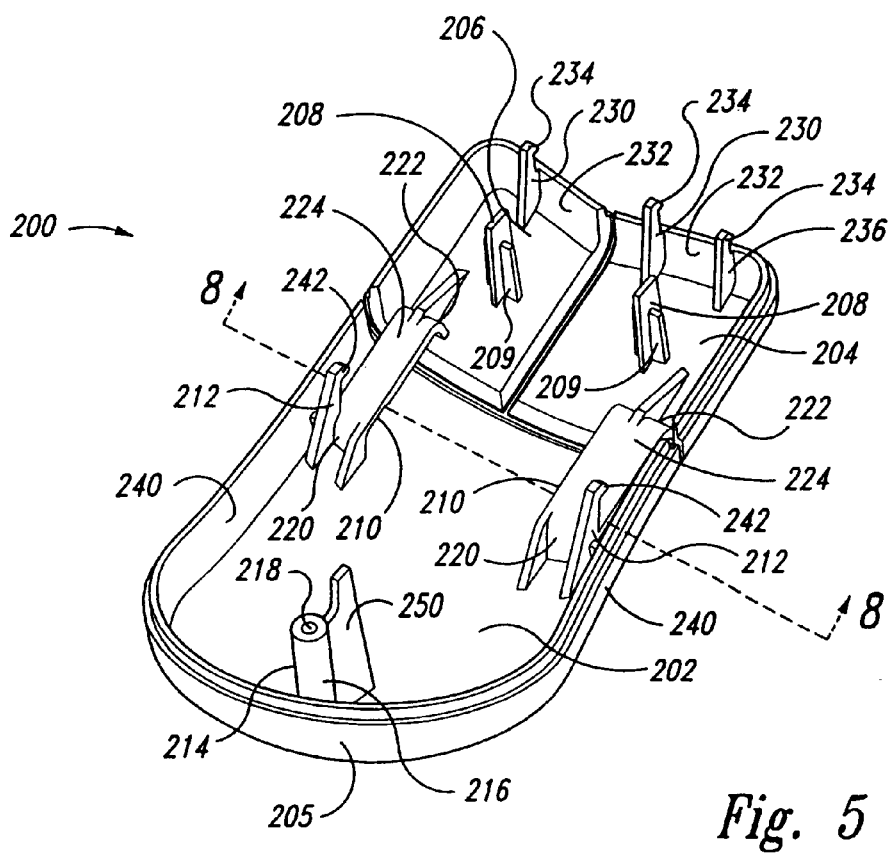
FIG. 5 is an enlarged bottom perspective view of the mouse pointing device of FIG. 1 showing the interior of the case top.

As shown in FIGS. 1 and 3, the case top 200 includes a main body 202, and side-by-side primary and secondary buttons 204 and 206, respectively, positioned forward of the main body. The primary and secondary buttons 204 and 206 are generally rectangular in shape and together with the main body 202 define the top side of the housing 114 of the mouse 100. The buttons 204 and 206 are movable between rest and actuation positions and, as best shown in FIGS. 4 and 5, each includes an actuating member 208 attached thereto and extending downward into the interior of the mouse 100. Actuator slots 420 (see FIG. 3) in the top side of the switch case 402 receive the actuating members 208, and the free ends of the actuating members touch the contact leaves 472 of the switch spring 470. Depressing one or both of the buttons 204 and 206 into the actuation position flexes the corresponding contact leaf 472 downwards, making its electrical contact with the corresponding contact 520 on the printed circuit board 500 (see FIG. 16). This produces a switch signal transmitted to and processed by the circuitry 512 on the printed circuit board 500 (see FIG. 3) and output to the computer 106 (see FIG. 1) for entering commands into the computer.

Upon release of the buttons 204 and 206, spring arms 210 (see FIGS. 4 and 5), each connecting the main body 202 to one of the buttons 204 and 206, bias the buttons upward away from the actuation position into the rest position. The C-shaped leaf spring elements 476 of the switch spring 470 return the contact leaves 472 of the switch spring to the rest position, out of contact with the contacts 520 on the printed circuit board 500 (see FIG. 15).

As best shown in FIG. 5, each of the spring arms 210, connecting one of the primary and secondary buttons 204 and 206 to the main body 202 of the case top 200, includes a main body support member or leg 220 that extends downward from the interior side of the main body 202, and a button support member or leg 222 that extends downward from the interior side of a respective one of the buttons 204 and 206. Each spring arm 210 also includes a rectangular leaf spring 224 oriented approximately parallel to the top sidewall 201 of the case top 200 and extending between a free end of the main body leg 220 and a free end of the button leg 222.

The main body legs 220 are each connected to the main body 202 at a position rearward of a forward edge of the main body 202. The button legs 222 are each connected to a corresponding one of the buttons 204 and 206 at a position forward of a rearward edge of the corresponding button and proximate to a middle portion of the button. The spring arms 210 allow each of the primary and secondary buttons 204 and 206 to maintain a substantially horizontal attitude when depressed. This contrasts favorably with other attempts at unitary case top design, where the buttons are attached to the main body along adjacent edges and pivot about these edges. In the case of such an attachment, known to the art as a "living hinge", portions of the button distal from the main body experience greater displacements than portions proximate to the main body, resulting in an unsatisfactory tilting button movement.

Also shown in FIG. 5, a restraining member or arm 230 extends downward from the interior side of each of the primary and secondary buttons 204 and 206. The restraining arms 230 are each connected to a corresponding one of the buttons 204 and 206 at a forward edge of the corresponding button and to the interior side of the front sidewall 232. Tabs 234 project forward from the free ends of the restraining arms 230.

Figure 6:
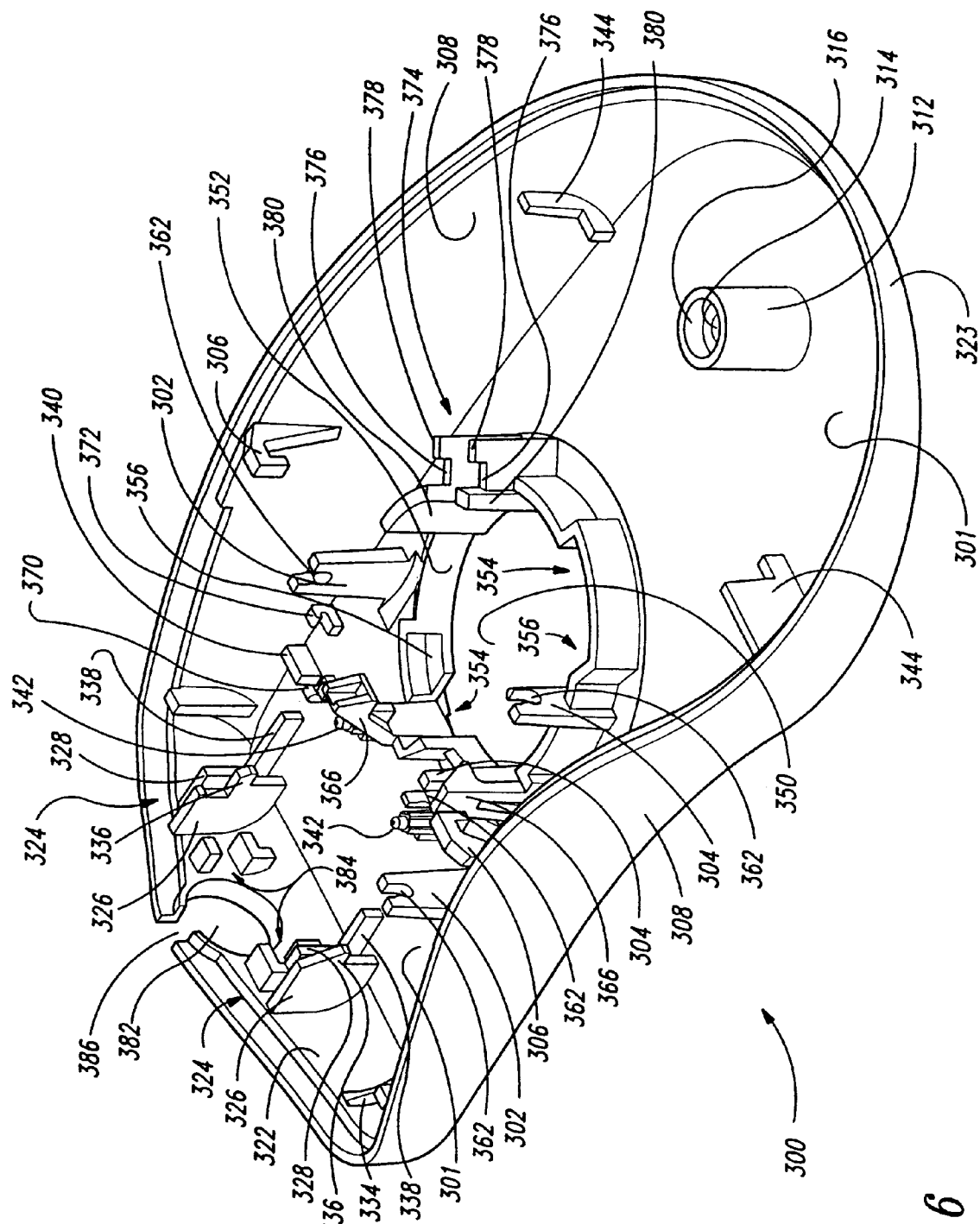
FIG. 6 is an enlarged top perspective view of the mouse pointing device of FIG. 1 showing the interior of the case bottom.
Figure 7:
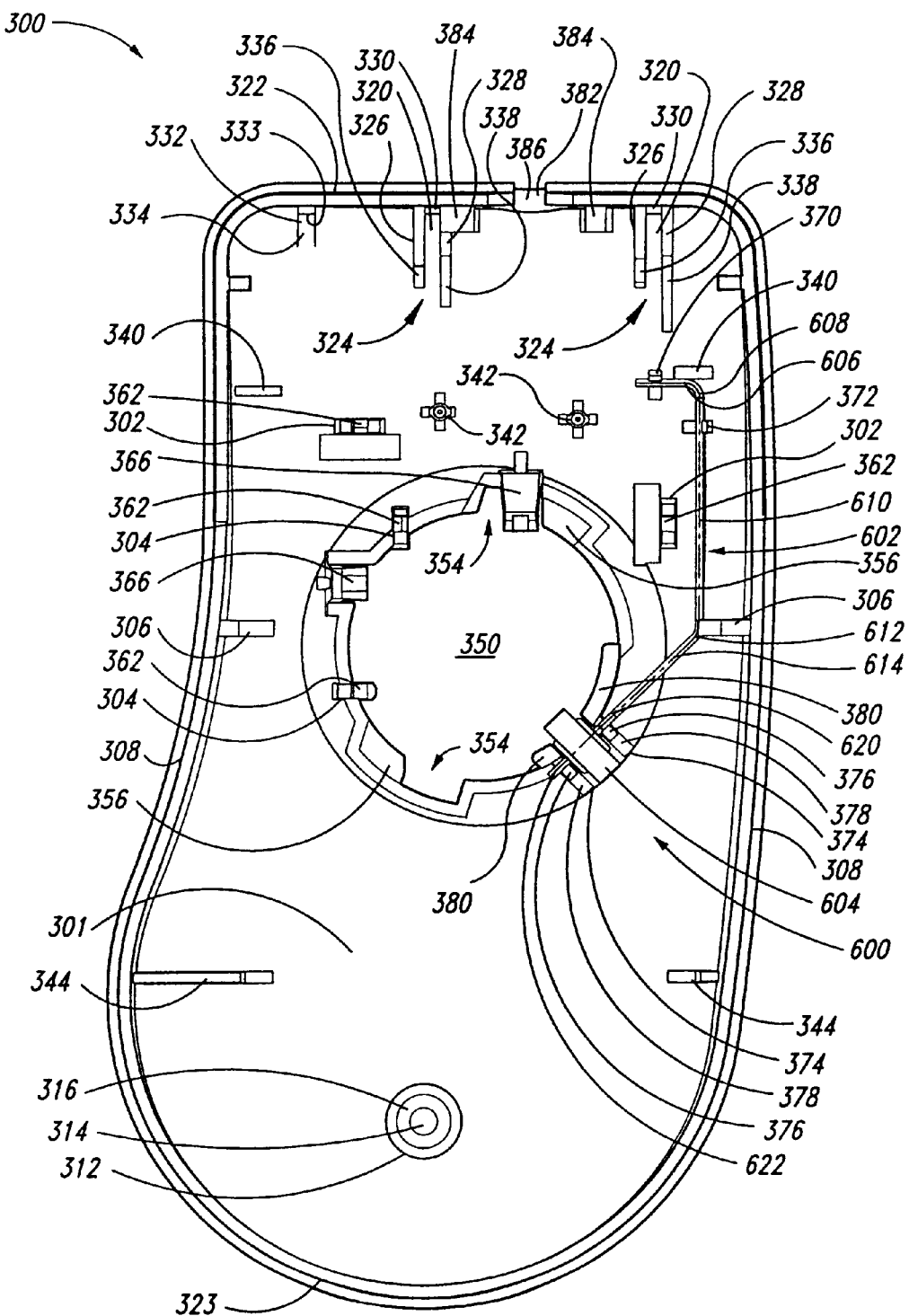
FIG. 7 is an enlarged top plan view of the case bottom of the mouse pointing device of FIG. 1 showing a spring rod and roller unit in place.

As shown in FIG. 7, the case bottom 300 includes two restraining members that are vertically oriented tracks 320, each designed to receive one of the restraining arms 230 of the buttons 204 and 206. Each of the guide tracks 320 is formed by a parallel plate structure 324, including a securing plate 326 and a parallel support plate 328. As shown in FIG. 6, the plates 326 and 328 are both connected to the interior sides of the front and bottom sidewalls 322 and 301 of the case bottom 300, and oriented approximately parallel to the left and right sidewalls 308 of the case bottom. Located within each guide track 320 is a horizontal shelf 330 spanning the gap between the corresponding securing plate 326 and supporting plate 328 and connected to the sides of the plates facing one another. The shelf 330 extends inward from the interior side of the front sidewall 322 of the case bottom 300.

When the case top 200 is attached to the case bottom 300, each of the vertical guide tracks 320 of the case bottom slideably receives a corresponding one of the restraining arms 230 of the primary and secondary buttons 204 and 206. The tab 234 extending from the restraining arm 230 projects forward and beneath the horizontal shelf 330 in the guide track 320. In the rest position of the buttons 204 and 206, each of the forward projecting tabs 234 contacts the underside of the corresponding shelf 330, and thereby limits the upward travel of the buttons resulting from the upward bias force imparted by the spring arms 210 to the buttons.

The guide tracks 320 of the case bottom 300 also maintain the lateral separation of the primary and secondary buttons 204 and 206 and limit any torsional tilting movement of the buttons. The restraining arms 230, each extending from the interior side of one of the buttons 204 and 206 of the case top 200, are restrained by the parallel plate structures 324 against any substantial leftward or rightward horizontal movement.

Referring again to FIG. 5, a supplementary restraining arm 236 is provided for the primary button 204 and extends downward from the interior side of the primary button. As shown in FIG. 7, a supplementary guide track 332 is formed by a groove 334 (see also FIG. 6) in the interior side of the front sidewall 322 of the case bottom 300. The supplementary restraining arm 236 includes a forwardly projecting tab 234, and an undercut 333 is located within the groove 334 forming the supplementary guide track 332. The supplementary track 332 receives the supplementary restraining arm 236, and the tab 234 projecting from the supplementary restraining arm engages the undercut 333 located within the groove 334 in a manner similar to and for the same purpose as described above.

The case top 200 has left and right securing members or arms 212, as shown in FIGS. 4 and 5, extending downward from the interior side of the main body 202 of the case top, which engage left and right securing members or hooks 306, shown in FIGS. 3 and 6, projecting laterally inward from the interior side of the left and right sidewalls 308 of the case bottom 300 for purposes of releasably attaching the case top 200 to the case bottom 300. A tab 242 extends forward from the free end of each of the left and right securing arms 212 (see FIG. 5). Each of the left and right securing hooks 306 releasably engages a corresponding one of the securing tabs 242 extending from the respective one of the securing arms 212 to removably and securely hold the case bottom 300 and the case top 200 together.

As shown in FIGS. 4 and 5, a top fastening member 214 extends downward from the interior side of the main body 202 and includes a cylindrical shaft 216 having a bore 218. As shown in FIGS. 3 and 6, a bottom fastening member 312 extends upwardly from the interior side of the bottom sidewall 301 of the case bottom 200. The bottom fastening member 312 has a cylindrical recess 316 which receives the cylindrical shaft 216 of the case top fastening arm 214. A selectively removable fastener or self-tapping screw 310, coaxially received by a bore 314 in the bottom fastening arm 312 of the case bottom 300 and the bore 218 in the top fastening member 214 (see FIG. 5) of the case top 200, releasably fastens the case bottom to the case top using only a single screw.

Figure 8:
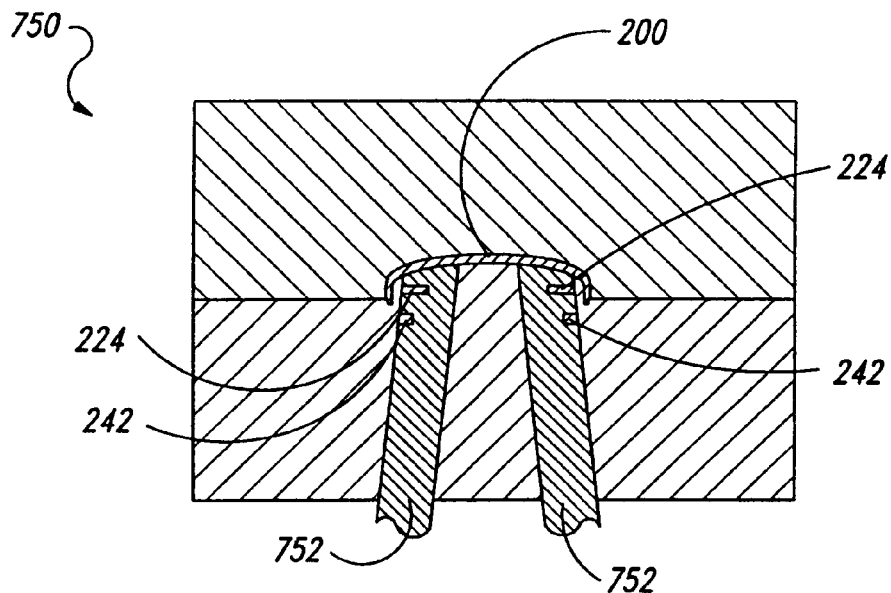
FIG. 8 is a cross-sectional view showing a closed mold during manufacture of the case top.
Figure 9:
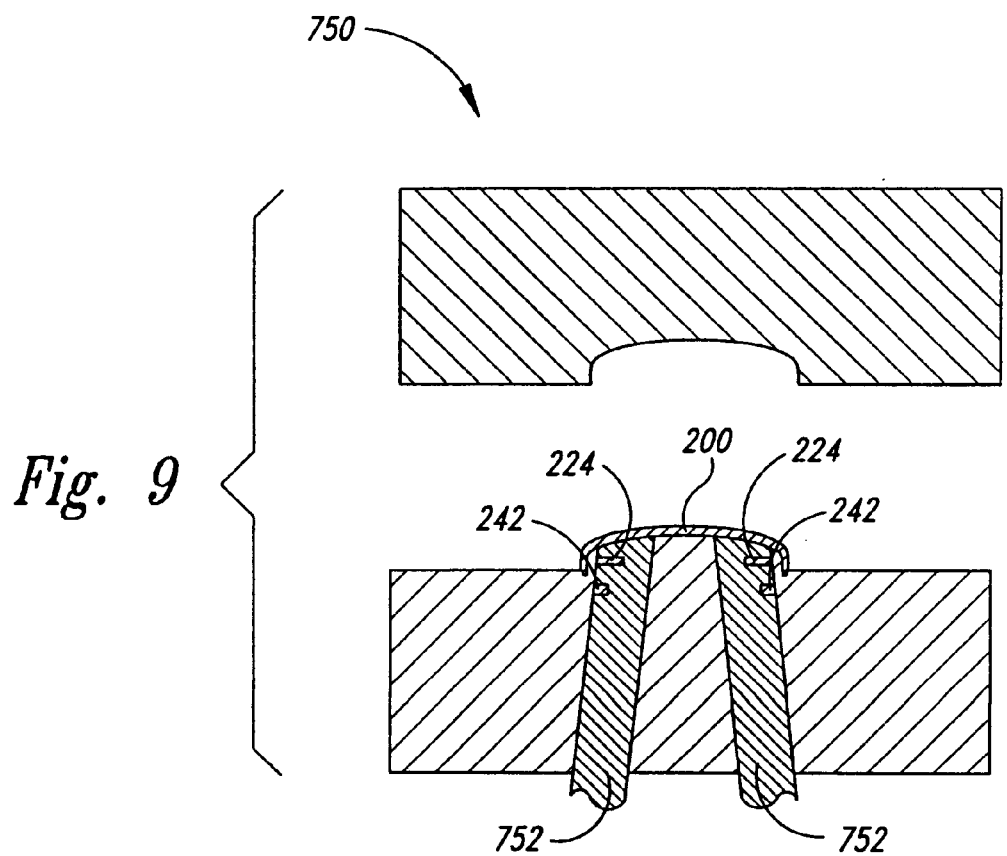
FIG. 9 is a cross-sectional view showing the mold of FIG. 8 open prior to ejection of the molded case top.
Figure 10:
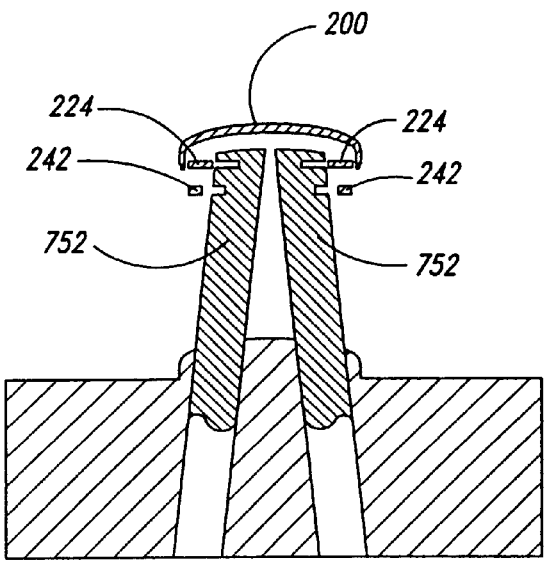
FIG. 10 is a cross-sectional view showing the molded case top ejected from the lower half of the mold of FIG. 9.

As shown in FIG. 5, the left and right securing arms 212 are located proximate to the left and right sidewalls 240, respectively, of the case top, and are each connected to the interior side of the main body and to a rearward facing side of a corresponding one of the main body legs 220 of the spring arms 210. Indeed the corresponding securing arm and spring arm can be considered parts of a single structure. This leads to important economies when manufacturing the case top 200. FIGS. 8–10 show cross-sectional views of a mold 750 having two lift-cores 752 used to form the case top 200, showing the cross-section taken just forward of the main body leg 220 and securing arm 212 as indicated by the line 8—8 in FIG. 5. FIG. 8 shows the mold 750 in the closed position, while FIG. 9 shows the mold open prior to ejecting the molded case top 200. A single one of the lift-cores 752 simultaneously forms the rectangular leaf spring 224 of one of the spring arms 210 and the securing tab 242 of the adjacent securing arm 212. As shown in FIG. 10, the lift-cores 752 eject the case top 200 from the mold 750 and simultaneously release the rectangular leaf springs 224 and securing tabs 242. A third lift-core (not shown) is used to form each of the projecting tabs 234 extending from the corresponding one of the restraining and supplementary restraining arms 230 and 236 of the primary button 204, and a fourth lift-core (not shown) is used to form the projecting tab 234 extending from the restraining arm 236 of the secondary button 206. Thus, only four lift-cores are required to mold the unitary case top 200 of the present invention.

Figure 11:
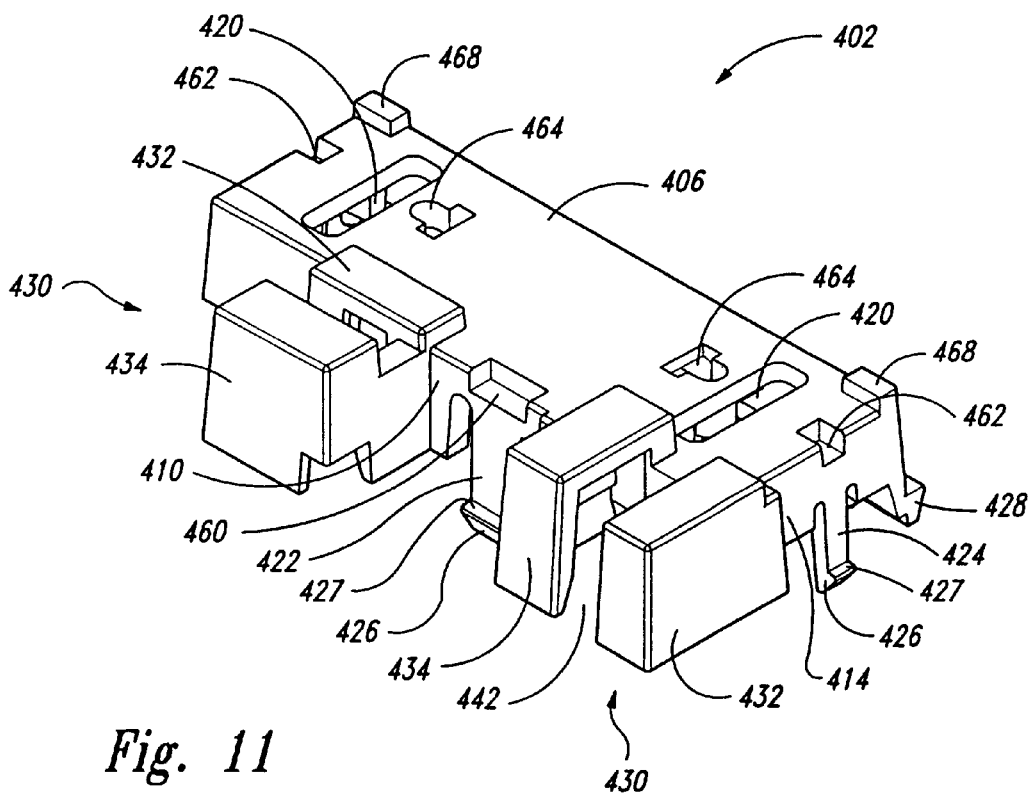
FIG. 11 is an enlarged rear perspective view showing the switch case used in the mouse pointing device of FIG. 1.
Figure 12:
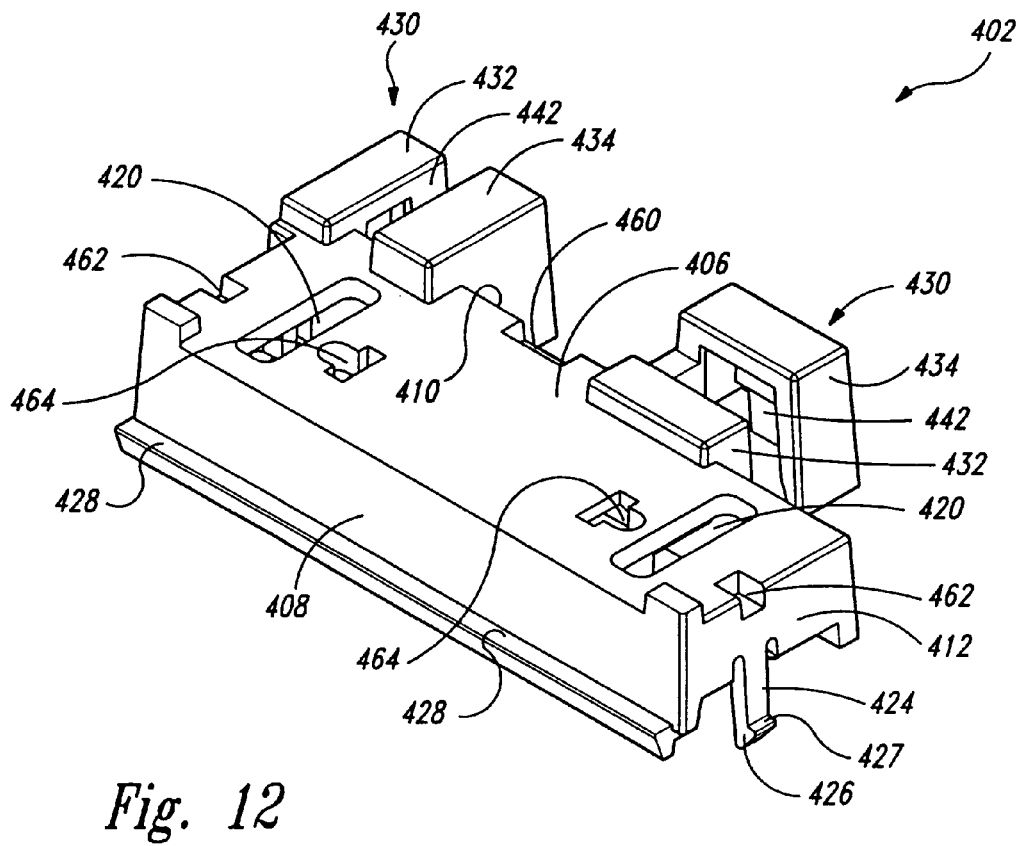
FIG. 12 is a front perspective view showing the switch case of FIG. 11.
Figure 13:
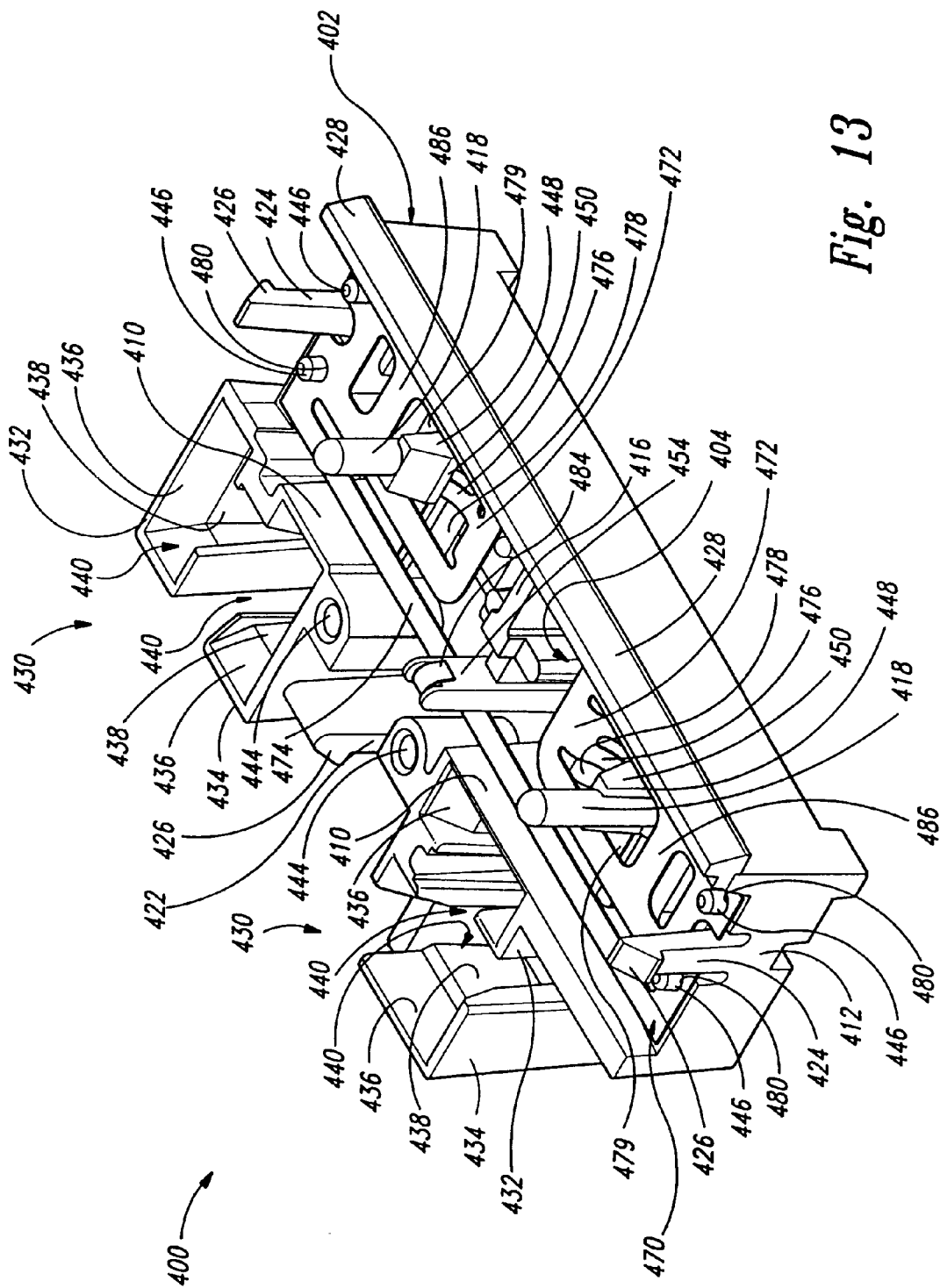
FIG. 13 is an enlarged, bottom perspective view showing the interior of the switch case of FIG. 11 with the switch spring in place.
Figure 21:
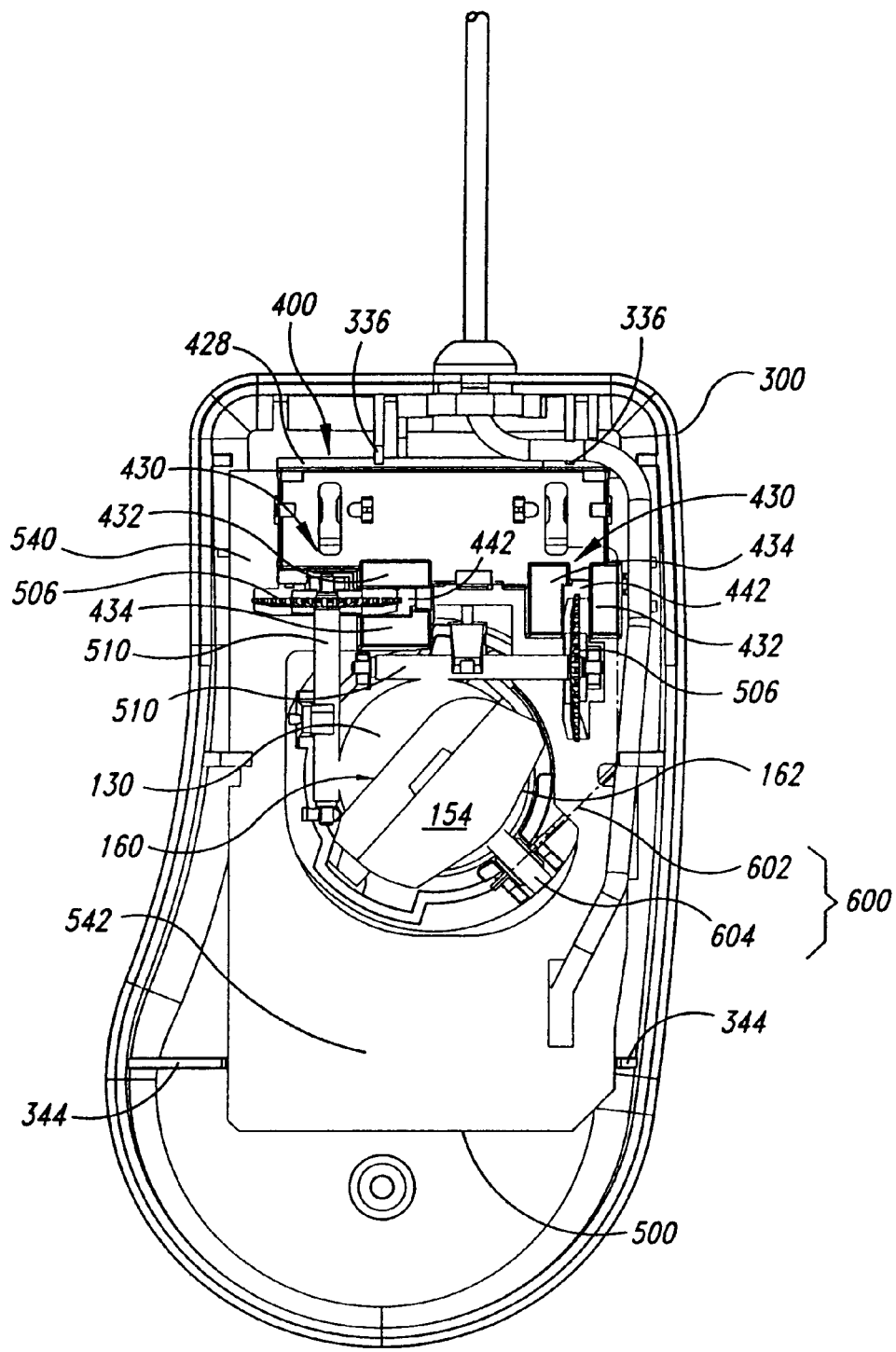
FIG. 21 is a top plan view of the assembled components and case bottom of FIG. 20.

As shown in FIGS. 11–13, the switch case 402 has a top sidewall 406, front and rear sidewalls 408 and 410, respectively, and left and right sidewalls 412 and 414, respectively. The switch case 402 has no bottom sidewall. As shown in FIG. 21, the switch package 400 is mounted on a forward portion 540 of a top side of the printed circuit board 500. As shown in FIG. 13, a rear snap mounting leg 422 extends downward from a lower edge of the rear sidewall 410 of the switch case 402. A tab 426 extends horizontally rearward from the free end of the rear mounting leg 422. A snap mounting leg 424 extends downward from the lower edge of each of the left and right sidewalls 412 and 414 of the switch case 402. A tab 426 extends laterally outward from the mounting leg 424. Mounting slots 530 in the printed circuit board 500 (see FIG. 4) each receive one of corresponding snap mounting members or legs 422 and 424. Alignment pins 418 (see FIGS. 4, 13 and 15) extend downward from the interior side of the top sidewall 406 of the switch case 402 and are received by alignment holes 532 in the printed circuit board 500, thereby laterally aligning the switch case relative to the circuit board.

Figure 22:
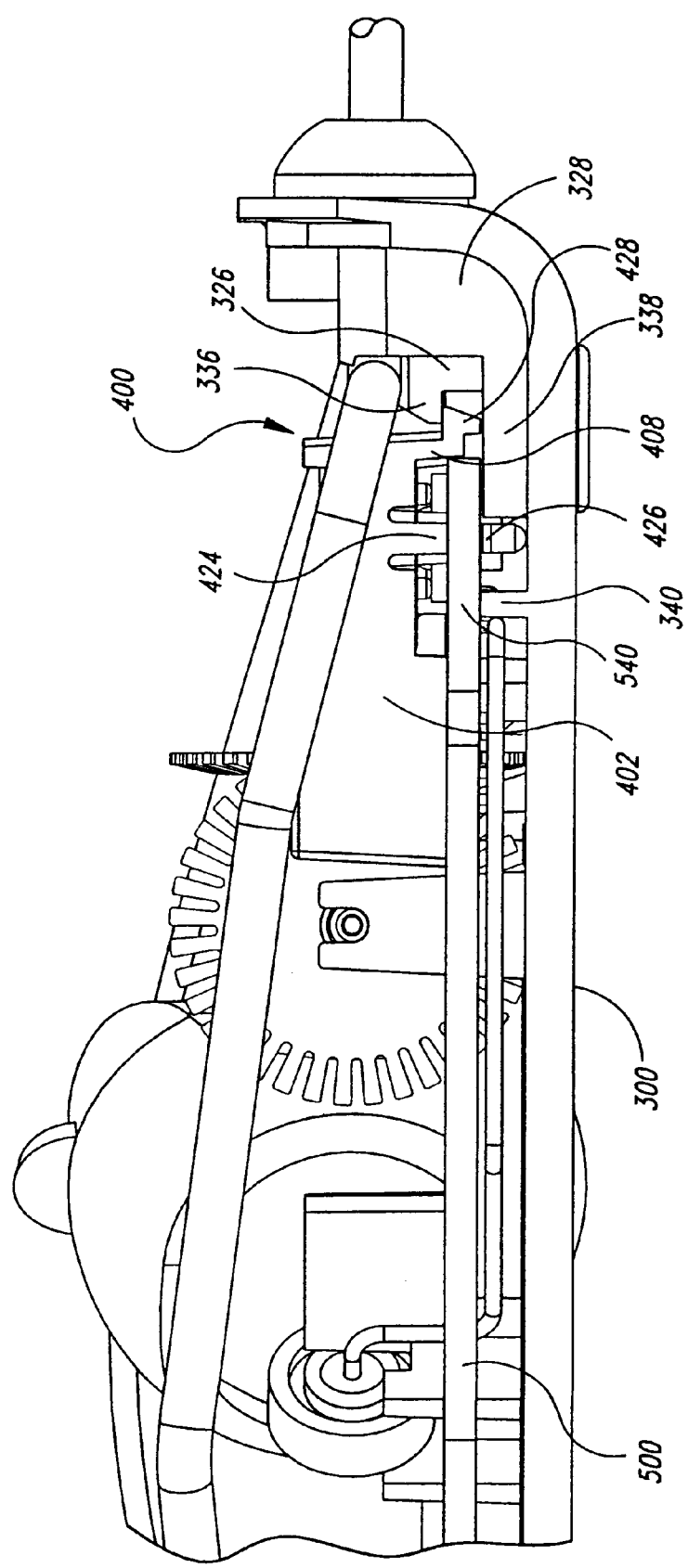
FIG. 22 is an enlarged, right side elevational view of a forward portion of the assembled components and case bottom of FIG. 20.

Each of the tabs 426 extends below and contacts the bottom side of the printed circuit board 500 to firmly secure the switch package 400 to the printed circuit board, as shown in FIG. 22. Each of the tabs 426 has an upward facing surface 427 with a downwardly directed taper away from the free end of the corresponding mounting leg 422 and 424, as shown in FIG. 15. The mounting slots 530 in the circuit board 500 are sized to allow the mounting legs 422 and 424 to flex. The tapered upward facing surface 427 allows the switch package to be firmly secured to printed circuit boards 500 of varying thicknesses. For example, if the switch case 402 is mounted on a slightly thicker than expected circuit board 500, the mounting legs 424 would flex laterally inward and the printed circuit board would contact laterally outward portions of the tapered upwardly facing surfaces 427 (see FIG. 15A).

As shown in FIGS. 11 and 13, the photoelectronics housing units 430 of the switch case 402 are positioned at and extend rearward of the rear sidewall 410 of the switch case. Each housing unit 430 includes an LED cover 432 and a photodetector cover 434. Each of the covers 432 and 434 has an open bottom and an interior recess which receives a corresponding one of the LEDs 502 and photodetectors 504 mounted on the printed circuit board 500. As shown in FIG. 13, a lower portion 436 of the interior surface of each cover 432 and 434 has an inwardly directed taper away from the printed circuit board 500, and an upper portion 438 of the interior surface of each cover is approximately vertical. As the photoelectronics housing units 430 are placed over the LEDs 502 and photodetectors 504 upon assembly of the mouse 100 (see FIG. 3), the tapered lower portion 436 of the interior surface of the covers 432 and 434 guides the corresponding one of the LEDs and photodetectors received therein into position within the upper portion thereof. The LEDs 502 and photodetectors 504 are thus positioned and aligned for a subsequent wave-soldering process. This provides a distinct advantage over the current art, which requires either placement and removal of a position and alignment fixture apparatus or hand alignment after the wave-soldering process.

As shown in FIG. 13, each of the covers 432 and 434 of each photoelectronics housing unit 430 has an open side 440 that faces the open side of the other cover to allow light emitted by the LED 502 in the cover 432 to be detected by the photodetector 504 in the corresponding cover 434. A gap 442 (see FIG. 12) is provided between the covers 432 and 434 of each housing unit 430 to accommodate a corresponding one of the notched encoder wheels 506 (see FIGS. 20 and 21) therein. As previously discussed, the encoder wheel 506 selectively modulates the light received by the photodetector 504 from the corresponding LED 502.

As shown in FIGS. 21 and 22, the switch package 400 is mounted adjacent to a forward edge of the printed circuit board 500. Referring to FIG. 22, the front sidewall 408 of the switch case 402 extends downward at a position forward of the front edge of the printed circuit board 500. A case securing member or ridge 428, located on the lower exterior side of the front sidewall 408 of the switch case 402 projects horizontally forward. A securing member 336 projects horizontally rearward from each of the securing plates 326 of the parallel plate structures 324 of the case bottom 300 (see FIG. 6). The printed circuit board 500, together with mounted switch package 400, is positioned within the interior of the case bottom 300. The securing ridge 428 of the switch case 402 extends forward below and contacts the underside of the securing members 336 of the case bottom 300, thereby restricting the upward vertical movement of the forward portion 540 of the printed circuit board 500 (see FIGS. 21 and 22).

As shown in FIGS. 6 and 7, a support 338 extends rearward from each of the support plates 328 of the parallel plate structures 324 of the case bottom 300 along the interior side of the bottom sidewall 301 of the case bottom. The supports 338 contact the underside of the securing ridge 428 and support the front sidewall 408 of the switch case 402 (see FIG. 22). The securing members 336 and the supports 338 of the case bottom 300 together function as a bottom securing member to releasably engage the securing ridge 428 and removably secure to the case bottom the switch package 400 and the circuit board 500 attached thereto. With the upward and downward movement of the switch case 402 respectively restricted by the securing members 336 and the supports 338 of the case bottom 300, the switch package has a determined vertical position within the housing 114 of the mouse 100 independent of any variance in thickness of the printed circuit board 500. This determined vertical position is important since actuation of the switch package 400 is effected by vertically depressing the primary and secondary buttons 204 and 206 of the case top 200, and any appreciable variance in vertical positioning of the switch package 400 relative to the buttons might affect its proper functioning.

As shown in FIGS. 6 and 7, left and right block supports 340 extend upward from the interior side of the bottom sidewall 301 of the case bottom 300. The block supports 340, together with the supports 338, support the forward portion 540 of the printed circuit board 500 thereon and restrict its downward movement (see FIG. 22).

The printed circuit board 500 has left and right holes 534 (see FIG. 4), and the switch case 402 has left and right alignment holes 444, located on the lower edge of the rear sidewall 410 of the switch case (see FIG. 13), positioned above the alignment holes in the printed circuit board. The corresponding holes 534 of the printed circuit board 500 and alignment holes 444 of the switch case 402 receive left and right alignment pins 342 therethrough which extend upward from the interior side of the bottom sidewall 301 of the case bottom 300 (see FIG. 6). The alignment pins 342 restrict the lateral movement of the switch package 400 and the printed circuit board 500 attached thereto. The free ends of the pins 342 also define a seating surface for the switch case 402, thereby fixing the vertical position of the switch package 400 relative to the case bottom 300. Left and right bracket supports 344, extending upward from the interior side of the bottom sidewall 301 and from the interior sides of left and right sidewalls 308 of the case bottom 300 (see FIG. 6), support a rear portion 542 of the printed circuit board 500 thereon and restrict its left and right lateral movement (see FIG. 21).

As shown in FIGS. 4 and 5, a hold-down member or arm 250 extends downward from the interior side of the main body 202 of the case top 200. The hold-down arm 250 engages the top side of the rear portion 542 of the printed circuit board 500, when the mouse 100 is assembled. Together with the bracket supports 344, supports 338 and block supports 340 of the case bottom 300, and the interaction of the case bottom securing members 336 with the securing ridge 428 of the mounted switch case 402, the hold-down arm 250 securely holds the printed circuit board 500 in position within the housing 114 of the mouse 100.

Figure 14:
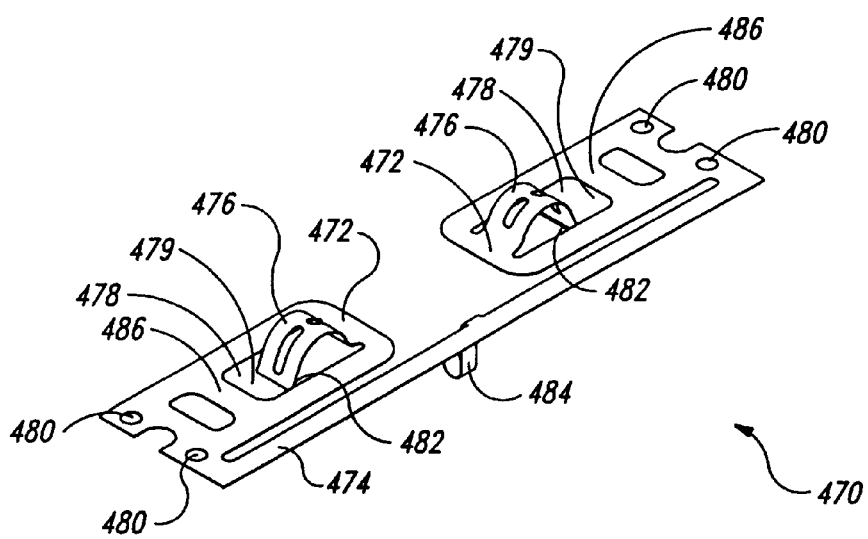
FIG. 14 is a reduced scale perspective view showing the switch spring of FIG. 13.

FIG. 13 shows the switch spring 470 positioned within the interior recess 404 of the switch case 402, and FIG. 14 shows the switch spring removed from the switch case. Each of the left and right contact leaves 472 has a pair of holding holes 480 located in a laterally outward end thereof which each receive a holding pin 446. The holding pins 446 extend downward from a lower edge of the left and right sidewalls 412 and 414 of the switch case 402. Subsequent to being received by the holding holes 480 upon assembly of the mouse 100, the holding pins 446 are either heat staked or cold staked, thereby fixing the laterally outward end of each of the left and right contact leaves 472 to the switch case 402.

Figure 15:
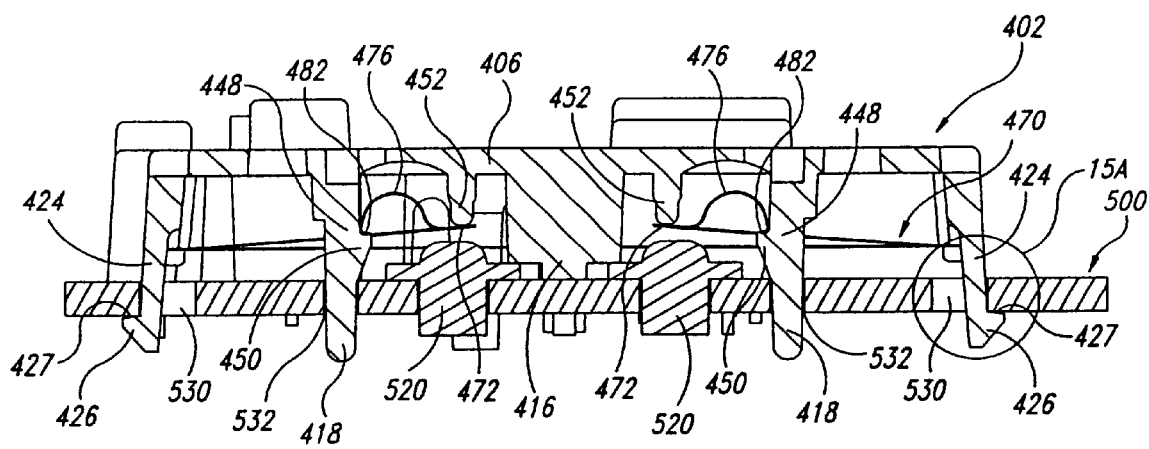
FIG. 15 is an enlarged, elevational, cross-sectional view showing the switch case of FIG. 11 mounted on the printed circuit board, with the switch spring positioned within the switch case in the rest configuration.
Figure 15A:
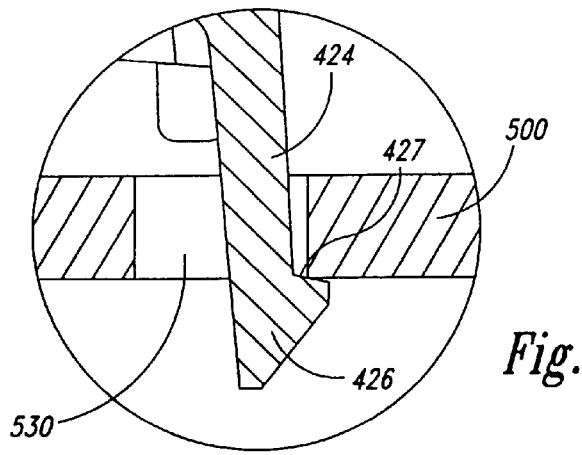
FIG. 15A is an enlarged fragmentary view of a circled portion of the switch case of FIG. 15 shown mounted on a printed circuit board of greater thickness than depicted in FIG. 15.
Figure 16:
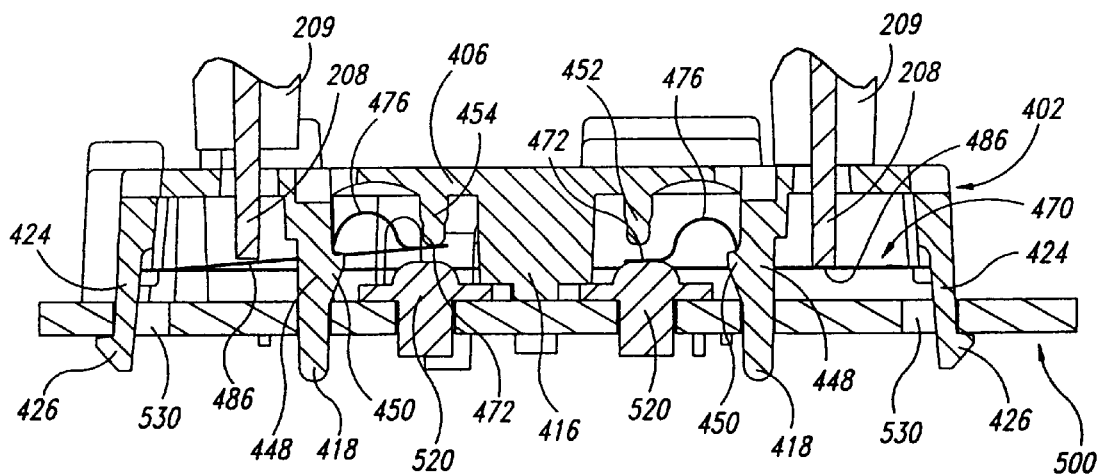
FIG. 16 is an elevational, cross-sectional view of the mounted switch case of FIG. 15 showing case top actuating members, and showing one contact leaf in an actuation position and another contact leaf in a rest position.

As shown in FIGS. 13, 15 and 16, each of the left and right contact leaves 472 of the switch spring 470 is oriented generally parallel to the printed circuit board 500 and extends from its fixed end in a direction towards the center of the switch case 402 and terminates in a free end. As shown in FIGS. 13 and 14, the left and right C-shaped spring elements 476 are each disposed in an opening 478 in the corresponding one of the left and right contact leaves 472 adjacent to its free end. The C-shaped spring element 476 is connected to and extends from a position proximate to the free end of the corresponding contact leaf 472 in a direction back towards the fixed end of the corresponding contact leaf and terminates in a free end. In an unflexed state the C-shaped spring elements 476 each pass through the opening 478 in the corresponding one of the contact leaves 472, and the free ends of the spring elements reside at positions displaced from a plane defined by the contact leaves. When positioned within the recess 404 of the switch case 402, the C-shaped spring elements 476 curve upward with a mid-portion toward the interior side of the top sidewall 406 of the switch case. The free end of each of the C-shaped spring elements 476 is bent back on itself to make a horizontal end portion 482 and to leave a portion 479 of the opening 478 in each of the contact leaves 472 unobstructed to receive a corresponding one of left and right support arms 448 therethrough (see FIGS. 13, 15 and 16).

As shown in FIGS. 13, 15 and 16, the left and right support members or arms 448 extend downward from the interior side of the top sidewall 406 of the switch case 402 and are preferably molded as part of the same structures that include the alignment pins 418, discussed above. Each of the support arms 448 extends into the unobstructed portion 479 of a corresponding one of the openings 478 in the left and right contact leaves 472 of the switch spring 470 (see FIG. 14). Each has a laterally extending tab 450 at a free end thereof projecting toward the center of the switch case 402. Each of the end portions 482 of the respective C-shaped spring elements 476 of the switch spring 470 is supported by a corresponding one of the tabs 450. The left and right support arms 448 are spaced apart so that when the switch spring 470 is mounted within the recess 404 of the switch case 402, the C-shaped spring elements 476 are held by the support arms in a somewhat flexed state with a smaller radius of curvature than when in the unflexed state. Thus, the end portions 482 of each C-shaped spring element 476 flexingly engage the corresponding one of the tabs 450 and a center facing side of the corresponding support arm 448. With this arrangement, each of the C-shaped spring elements 476 biases the free end of the corresponding one of the contact leaves 472 upwards away from the printed circuit board 500. As shown in FIGS. 15 and 16, restraining members or ridges 452 extend downward from the interior side of the top sidewall 406 of the switch case 402 and engage a corresponding one of the upwardly biased free ends of the contact leaves 472 to limit the upward movement thereof resulting from the bias force imparted to each of the contact leaves by the respective one of the C-shaped spring elements 476.

As shown in FIGS. 13 and 14, the common contact ribbon 474 of the switch spring 470 connects together each of the fixed ends of the left and right contact leaves 472. When the switch spring is positioned within the recess 404 of the switch case 402, the common contact ribbon 474 is disposed approximately parallel and adjacent to the interior side of the rear sidewall 410 of the switch case. A common contact strip 484 extends from a middle portion of the common contact ribbon 474. A common contact arm 454 extends downward from the interior side of the top sidewall 406 of the switch case 402. The common contact strip 484 is aligned with the common contact arm 454, and a free end portion of the common contact strip wraps around a free end of the common contact arm. When the switch package 400 is mounted on the circuit board 500, the common contact arm 454, along with the common contact strip 484, is embedded into the printed circuit board, where wave soldering fixedly and electrically connects the common contact strip 484 to an electrical common contact of the circuitry 512 on the printed circuit board.

As previously noted, each of the actuating members 208 extends downward from the interior side of one of the primary and secondary buttons 204 and 206 of the case top 200 (see FIG. 5). Each actuating member 208 passes through a corresponding one of the actuator slots 420 formed in the top sidewall 406 of the switch case 402 (see FIG. 11). Each of the contact leaves 472 of the switch spring 470 has a cross piece 486 (see FIGS. 13 and 14) which is engaged by the free end of the corresponding actuating member 208. As shown in FIG. 16, depressing one of the buttons 204 and 206 downward from the rest position to the actuation position causes the respective actuating member 208 to press downward on the corresponding one of the cross pieces 486. This overcomes the upward bias imparted to the contact leaf 472 by the corresponding one of the C-shaped spring elements 476, and the contact leaf flexes downward and makes contact with a corresponding one of the electrical contacts 520 connected to the circuitry 512 on the printed circuit board 500. The downward movement of the actuating members 208 is limited by stops 209 which extend laterally from the actuating members (see FIG. 5) and, upon user depression of one or both of the buttons 204 and 206, contact the exterior side of the top sidewall 406 of the switch case 402 (see FIG. 16).

FIG. 17 shows one switch case 402A stacked on another switch case 402B. The stackability of switch cases leads to certain economies. Switch cases can be manufactured in one location, and packed in a nested stack for safe shipping to a mouse assembly site in another location. Without the stacking feature, each individual switch case would have to be wrapped to assure against damage during transit from the switch case manufacture site to the mouse assembly site.

As seen in FIG. 11, a rear notch 460 is formed on the exterior of the switch case 402 at the junction of the top and rear sidewalls 406 and 410 and positioned to be directly below the rear mounting leg 422 extending downward from the rear sidewall of a switch case stacked thereabove. Similarly, left and right side notches 462 are formed on the exterior of the switch case 402 at the junctions of the left and right sidewalls 412 and 414 with the top sidewall 406, respectively, and positioned to be directly below the left and right side mounting legs 424, respectively, extending downward from the left and right sidewalls of the switch case stacked thereabove (see FIGS. 11 and 12). In such fashion, the rear notch 460 on the lower switch case 402B in the stack receives the rear mounting leg 422 of the upper switch case 402A stacked on top, while the side notches 462 of the lower switch case accommodate the side mounting legs 424 of the upper switch case (see FIG. 17). Slots 464 (see FIG. 11), located in the top sidewall 406 of the switch case 402B (see FIG. 17), receive the alignment pins 418 (see FIG. 13) of the upper switch case 402A (see FIG. 17) stacked on top, thereby restricting relative lateral movement of the stacked switch cases. Additionally, each switch case 402 has stacking posts 468 located on the top front left and right corners of the switch case (see FIG. 11). As shown in FIG. 17, the stacking posts 468 on the lower switch case 402B contact the lower edge of the front sidewall 408 of the upper switch case 402A stacked on top. The outer edges of the photodetector covers 434 of the housing units 430 are tapered so that a top portion of the photodetector cover of the lower switch case 402B nests within an open bottom portion of the photodetector cover of the upper switch case 402A stacked on top.

As shown in FIGS. 18 and 19, the ball retaining cage 150 generally includes an annular baseplate 152, a curved shield 154, and projecting wings 156. The curved shield 154 extends upward from the top side of the annular baseplate 152 into the interior compartment of the housing 114 of the mouse 100 (see FIG. 20). The curved shield 154 is generally spherical in curvature and is connected to the top side of the annular baseplate 152 at two generally diametrically opposite portions of the top side of the baseplate. The ball 130 is rotatably received within the retaining cage 150 and protrudes through the hole 158 in the annular baseplate 152 which forms a removable part of the bottom sidewall 301 of the case bottom 300 (see FIGS. 2 and 3). The curved shield 154 has a first side opening 160 that is large enough for the passage of the ball 130 therethrough upon assembly of the mouse 100 and allows the ball to contact the encoder shafts 510 (see FIG. 21). The curved shield 154 also has a second side opening 162 that allows the roller 604 of the biasing spring unit 600 to contact and bias the ball 130 against the encoder shafts 510 (see FIGS. 20 and 21). The wings 156 project horizontally from the curved shield 154 on diametrically opposite sides thereof at a position spaced above the annular baseplate 152 to form a gap 164 between each of the wings and the annular baseplate.

As shown in FIGS. 3, 4 and 6, an approximately circular opening 350 in the bottom sidewall 301 of the case bottom 300 receives the curved shield 154 of the retaining cage 150 with the enclosed ball 130. Referring to FIG. 6, the opening 350 has a sidewall 352. The opening includes approximately diametrically opposite notches 354 which receive the wings 156 upon initial placement of the retaining cage 150 in the opening 350. Subsequent rotation of the retaining cage 150 causes the gaps 164 formed between the wings 156 and annular baseplate 152 to receive horizontal shelves 356 located in the sidewall 352 of the case bottom opening 350 proximate to the notches 354. The projecting wings 156 rest on the top side of the horizontal shelves 356, while the annular baseplate 152 contacts the bottom side of the shelves, thereby removably securing the retaining cage 150, and ball 130 enclosed therein, to the case bottom 300.

Figure 20:
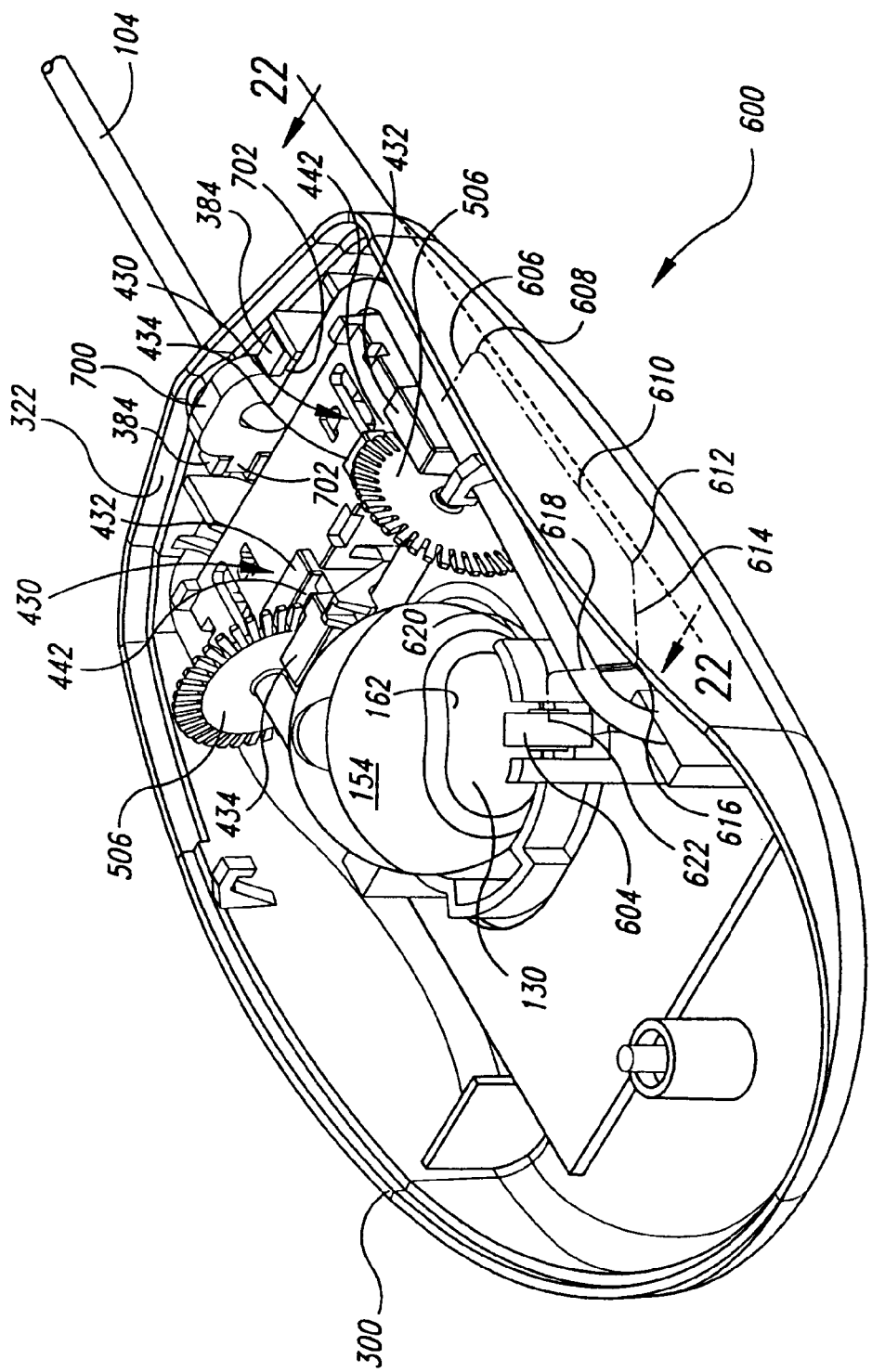
FIG. 20 is an enlarged, right side, top perspective view of the case bottom of the mouse pointing device of FIG. 1 showing the assembled components within the interior of the case bottom.
Figure 23:
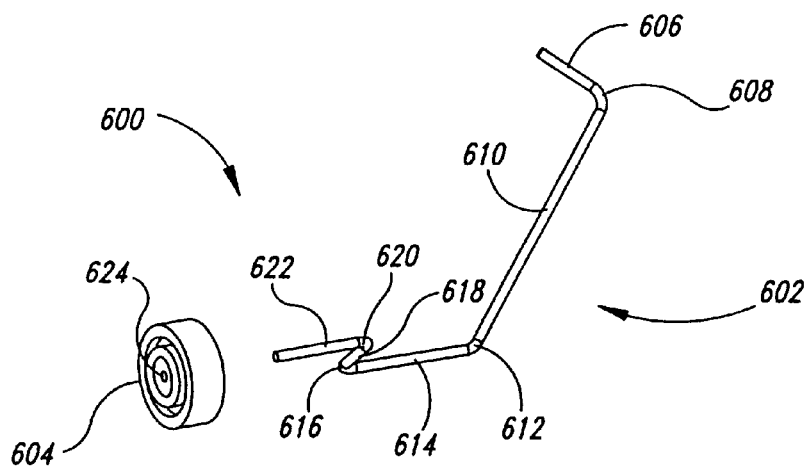
FIG. 23 is a perspective view of the disassembled spring rod and roller unit of FIG. 7.

FIGS. 7, 20 and 23 show the biasing spring unit 600 used for coupling the ball 130 to the transducers 110. The wire spring 602 has four bends or turns defining five sections. The end section 606 of the wire spring 602 is held by an attaching arm 370 connected to and extending upwards from the interior side of the bottom sidewall 301 of the case bottom 300. The end section 606 of the wire spring is oriented horizontally and approximately parallel to the front sidewall 322 of the case bottom 300. The rear facing side of the right block 340, which extends upward from the interior side of the bottom sidewall 301 of the case bottom 300, contacts the end section 606 proximate to a first turn 608 of the wire spring 602. The first turn 608 is approximately 90°. A primary spring section 610 of the wire spring 602 is located proximate and parallel to the interior side of the right sidewall 308 of the case bottom 300 and extends horizontally. A securing arm 372, connected to and extending upward from the interior side of the bottom sidewall 301 of the case bottom 300, engages the primary spring section 610 proximate to the first turn 608. The attaching arm 370, right block 340, and securing arm 372 of the case bottom 300 hold the wire spring 602 at positions just before, approximately at, and just after the first turn 608 of the wire spring (see also FIG. 6 for a view of these support structures).

A second turn 612 of the wire spring 602 is approximately 45°. A secondary spring section 614 is horizontally oriented and extends in a direction approximately tangential to the circular opening 350 in the bottom sidewall 301 of the case bottom 300. A third turn 616 is approximately 90°. A vertical section 618 of the wire spring 602 extends vertically and terminates in a fourth turn 620, of approximately 90°. The wire spring 602 extends from the fourth turn 620 and forms an axle section 622 which is horizontal and parallel to the secondary spring section 614. The axle section 622 extends through a central hole 624 in the roller 604, which is thereby rotatably disposed on the axle section of the wire spring 602. The wire spring 602 is bent and positioned to resiliently bias the roller 604 against the ball 130.

As shown in FIGS. 6 and 7, axle supports 374 are connected to and extend upward from the interior side of the bottom sidewall 301 of the case bottom 300 adjacent to the sidewall 352 of the opening 350. The axle supports 374 support portions of the axle section 622 of the wire spring 602 on opposite sides of the roller 604. The axle section 622 of the wire spring 602 rests on upward facing horizontal surfaces 376 of the axle supports 374. Vertical stops 378, extending upward from the horizontal surfaces 376 of the axle supports 374, restrict outward movement of the axle section 622 of the wire spring 602 at opposite sides of the mounted roller 604. Vertical shields 380, extending upward from the interior side of the bottom sidewall 301 of the case bottom 300, form part of the sidewall 352 of the opening 350 and restrict inward movement of the axle section 622 of the wire spring 602 at opposite sides of the mounted roller 604. This allows a limited amount of horizontal radial movement of the axle section 622 and roller 604 mounted thereon along the horizontal surfaces 376 of the axle supports 374, thereby allowing flexing of the wire spring 602 for purposes of continuously biasing the rotatable ball 130 against the encoder shafts 510 (see FIG. 21) for coupling the ball to the transducers 110.

Figure 24:
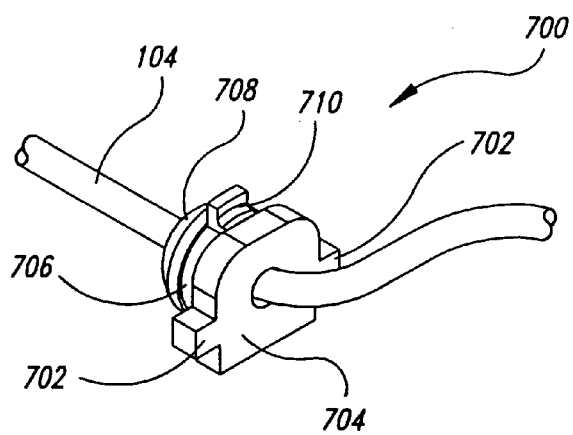
FIG. 24 is an enlarged perspective view of a cord strain relief component used in the mouse pointing device of FIG. 1.
Figure 25:
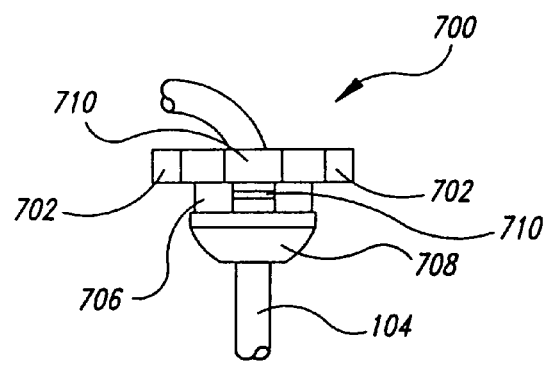
FIG. 25 is a top plan view of the cord strain relief component of FIG. 24.

FIGS. 24 and 25 show the strain relief unit 700, which grasps the cord 104 and transmits the mechanical strain experienced by the cord upon movement of the mouse 100 to the housing 114 of the mouse and not to the coupler 514 which connects the cord to the circuitry 512 on the printed circuit board 500 (see FIG. 3). The strain relief unit 700 is preferably made from flexible PVC, an elastomeric material. As shown in FIGS. 6 and 7, an opening 382 in the front sidewall 322 of the case bottom 300 receives the strain relief unit 700. Horizontal track supports 384, extending from the interior side of the front sidewall 322 of the case bottom 300 proximate to the opening 382, receive tabs 702 projecting horizontally from the strain relief unit 700 (see FIG. 20) and restrain any rotation of the strain relief unit relative to the opening.

The strain relief unit 700 is shown in detail in FIGS. 24 and 25, and includes a rear main plate 704, a reduced diameter intermediate section 706 and a tapered forward plate 708. As shown in FIGS. 6 and 7, the opening 382 in the front sidewall 322 of the case bottom 300 includes a gap 386. The case bottom 300 is constructed from flexible material, so the gap 386 in the opening 382 allows the tapered forward plate 708 of the strain relief unit 700 to be pushed forward through the opening. The intermediate section 706 expands and fits snugly within the opening 382. The rear main plate 704 and rearward facing side of the forward tapered plate 708 are each larger than the opening 382 in the front sidewall 322 of the case bottom 300, so that, once in place, the strain relief unit cannot move backward or forward through the opening. The strain relief unit 700 includes a covering tab 710 which, upon placement of the strain relief unit in the opening 382, covers the gap 386. The strain relief unit 700 is held in place solely by the case bottom 300 of the mouse 100.

As shown in FIGS. 3 and 4, each of the encoder shafts 510 includes a wheel pin 516 coaxially projecting from the end of the encoder shaft where the encoder wheel 506 is attached, and an end pin 518 coaxially projecting from the end of the shaft away from the encoder wheels. As shown in FIG. 6, a pair of wheel support arms 302 connect to and extend upward from the interior side of the bottom sidewall 301 of the case bottom 300, and have U-shaped free ends 362 which rotatably receive the wheel pins 516. A pair of shaft support arms 304 connect to and extend upward from the interior side of the bottom sidewall 301 of the case bottom 300, and have U-shaped free ends 362 which rotatably receive the end pins 518. One of each of the support arms 302 and 304 are spaced apart and positioned to support the encoder shaft 510 for one of the encoder wheels 506. The other one of each of the support arms 302 and 304 are spaced apart and positioned to support the encoder shaft 510 for the other of the encoder wheels 506.

The U-shaped free ends 362 of the support arms 302 and 304 support and horizontally restrain the encoder shafts 510 and encoder wheels 506, while allowing the encoder wheels and shafts to freely rotate. Latch arms 366 are connected to and extend upward from the interior side of the bottom sidewall 301 of the case bottom 300, and flex to allow positioning of the encoder shafts 510 and encoder wheels 506 in the U-shaped free ends 362 of the support arms 302 and 304. Upon positioning of the encoder wheels 506 and shafts 510, each of the latch arms 366 extends over a middle portion of the corresponding one of the encoder shafts 510, thereby restricting the upward movement of the shafts. This ensures that each of the wheel pins 516 and end pins 518 cannot be dislodged from a corresponding one of the U-shaped free ends 362 of the support arms 302 and 304.

Although a specific embodiment of the present invention has been described for purposes of illustration, various modifications may be made without departing from the spirit and scope of the invention. Accordingly, the invention is not limited by the disclosure, but instead its scope is to be determined by reference to the following claims.

What is claimed is:

1. An input device for providing user commands to a computer comprising:
    a transducer for receiving user commands indicating movement of the input device and producing a position signal in response thereto;
    a switch for receiving user commands indicating actuation of said switch and producing a switch signal in response thereto;
    a control circuit coupled to said transducer and to said switch for receiving said position signal and said switch signal and providing an output signal to the computer in response thereto;
    a case top forming a top side of a housing, said transducer and said switch being positioned within said housing, said case top being of one-piece construction and including a main body and a first top securing member projecting from said main body within said housing, said first top securing member including an arm extending from an interior side of said main body and a tab extending from a free end of said arm; and
    a case bottom forming a bottom side of said housing, said case bottom being of one-piece construction and including a first sidewall and a first bottom securing member projecting from said first sidewall within said housing, said first bottom securing member including a hook extending from an interior side of said first sidewall, said hook releasably engaging said tab to releasably secure said case bottom and said case top together.

2. The input device described in claim 1:
    wherein said case top includes a second top securing member projecting from said main body within said housing,
    and wherein said case bottom includes a second bottom securing member projecting from a second sidewall within said housing, said second bottom securing member releasably engaging said second top securing member to releasably secure said case bottom and said case top together.

3. The input device described in claim 2 wherein said first top securing member and said first bottom securing member are each disposed toward a left side within said housing, and wherein said second top securing member and said second bottom securing member are each disposed toward a right side within said housing, and wherein said case top and said case bottom are fastened together by no more than a single selectively removable fastener.

4. The input device described in claim 3 wherein said selectively removable fastener is disposed toward a rear side of said housing.

5. An input device for providing user commands to a computer comprising:
    a transducer for receiving user commands indicating movement of the input device and producing a position signal in response thereto;
    a switch for receiving user commands indicating actuation of said switch and producing a switch signal in response thereto;
    a control circuit coupled to said transducer and to said switch for receiving said position signal and said switch signal and providing an output signal to the computer in response thereto;
    a case bottom forming a bottom side of a housing, said transducer and said switch being positioned within said housing;
    a case top forming a top side of said housing, said case top including a main body and a button of unitary construction, said button being movable for user actuation of said switch;
    an arm extending from an interior side of said case top; and
    a hook extending from an interior side of said case bottom, said hook releasably engaging said arm to releasably secure said case bottom and said case top together,
    wherein said case top and said case bottom are held together by no more than a single selectively removable fastener.

6. An input device for providing user commands to a computer comprising:
    a case bottom forming a bottom side of a housing;
    a case top forming a top side of said housing, said case top including first and second buttons which are independently movable between rest and actuation positions, and first and second actuating members respectively projecting within said housing from said first and second buttons;
    a transducer positioned within said housing for receiving user commands indicating movement of said housing and producing a position signal in response thereto;
    a control circuit coupled to said transducer for receiving said position signal and providing an output signal to the computer in response thereto;
    a circuit board positioned within said housing and having said control circuit mounted thereon, said control circuit including first and second contacts on said circuit board; and
    a switch package mounted on said circuit board, said switch package consisting of a switch case of one-piece construction and a switch spring of one-piece construction, said switch spring being positioned within a recess of said switch case, said first and second actuating members of said case top respectively contacting and flexing said switch spring upon user actuation of said first and second buttons to make first and second momentary electrical connections between said switch spring and said first and second contacts on said circuit board, said first and second momentary electrical connections respectively producing first and second switch signals, said control circuit receiving said first and second switch signals and providing an output signal to the computer in response thereto.

7. The input device described in claim 6, wherein said switch case includes a case securing member, and wherein said case bottom includes a bottom securing member extending within said housing, said bottom securing member releasably engaging said case securing member to removably secure and position within said case bottom said switch package and said circuit board attached thereto.

8. The input device described in claim 7, wherein said case top of said housing includes a hold-down member extending within said housing, said hold-down member contacting said circuit board and restricting vertical movement of said circuit board.

9. The input device described in claim 6 wherein said switch spring includes first and second contact leaves respectively positioned above said first and second contacts on said circuit board, said first and second actuating members of said case top respectively contacting and flexing said first and second contact leaves upon user actuation of said first and second buttons to make said first and second momentary electrical connections between said first and second contact leaves and said first and second contacts on said circuit board.

10. The input device described in claim 9 wherein said switch spring includes first and second spring elements, said first and second spring elements respectively extending from said first and second contact leaves and biasing said first and second contact leaves away from said first and second contacts on said circuit board.

11. The input device described in claim 10 wherein said switch case includes first and second support members extending within said recess of said switch case, said first and second support members respectively supporting a free end of said first and second spring elements, and wherein said switch case includes first and second restraining members located within said recess of said switch case, said first and second restraining members respectively restraining upward travel of said first and second contact leaves resulting from an upward bias respectively imparted to said first and second contact leaves by said first and second spring elements.

12. The input device of claim 9 wherein said first and second contact leaves of said switch spring are each fixed at one end to said switch case.

13. An input device for providing user commands to a computer comprising:
 a housing having a top side and a bottom side secured together;
 a rotatable ball received within said housing;
 first and second transducers positioned within said housing and coupled to said rotatable ball, said first and second transducers producing first and second signals indicative of rotation of said ball;
 a switch positioned within said housing for receiving user commands indicating actuation of said switch and producing a switch signal in response thereto;
 a control circuit coupled to said first and second transducers and to said switch for receiving said first and second signals and said switch signal and providing an output signal to the computer in response thereto; and
 a retaining cage receiving said ball and being constructed for removing from and securing to said bottom side of said housing with said ball therein, while said bottom and top sides of said housing are secured together.

14. The input device described in claim 13 wherein said retaining cage includes an annular baseplate and a curved shield of unitary construction, said curved shield having an approximately spherical curvature and extending from said annular base plate.

15. The input device described in claim 14 wherein said curved shield has an opening sized to allow said ball to pass therethrough.

16. The input device described in claim 14 wherein said curved shield includes a wing extending generally parallel to said baseplate and forming a gap therebetween, said gap receiving a shelf portion of said bottom side of said housing to removably secure said retaining cage to said bottom side of said housing.

17. An input device for providing user commands to a computer comprising:
 a housing formed from a case top and a case bottom;
 a transducer positioned within said housing for receiving user commands indicating movement of said housing and producing a position signal in response thereto;
 a switch positioned within said housing for receiving user commands indicating actuation of said switch and producing a switch signal in response thereto;
 a control circuit coupled to said transducer and to said switch for receiving said position signal and said switch signal and providing an output signal to the computer in response thereto; and
 a cord making a connection to said control circuit and carrying said output signal to the computer; and
 a strain relief unit grasping said cord and being mechanically fixedly held solely by said case bottom, said strain relief unit transmitting any mechanical strain experienced by said cord upon user movement of the input device only to said case bottom.

18. The input device described in claim 17 wherein said strain relief unit includes a tapered portion, and said case bottom includes a flexible opening adapted to receive said tapered portion therethrough to secure said strain relief unit to said case bottom.

19. The input device described in claim 17 wherein said strain relief unit includes a projecting tab, and said case bottom includes a track to receive said projecting tab to restrain rotation of said strain relief unit relative to said case bottom.

20. The input device described in claim 17 wherein said strain relief unit includes a forward plate and a rear plate, and wherein said case bottom includes an opening, said forward plate positioned forward of said opening and said rear plate positioned rearward of said opening when said strain relief unit is held by said case bottom, said forward and rear plates sized to restrain forward and rearward motion of said strain relief unit relative to said case bottom.

21. The input device described in claim 20 wherein said forward plate is tapered and said opening is sufficiently flexible to receive said forward plate therethrough to secure said strain relief unit to said case bottom.

22. An input device for providing user commands to a computer, comprising:
 a housing having first and second buttons independently movable between rest and actuation positions;
 circuitry formed on a circuit board positioned within the housing, the circuitry including first and second contacts on the circuit board;
 a switch package consisting of a one-piece switch case and a one-piece switch spring, the switch spring positioned within the switch case, and the switch case mounted on the circuit board, the switch spring being operable to make first and second electrical connections with the first and second contacts, respectively, the first and second electrical connections being independently produceable by the one-piece switch spring flexing in response to user actuation of the independently movable first and second buttons.

23. The input device of claim 22 wherein the housing includes a first securing member, and the switch case includes a second securing member, the first securing member engaging the second securing member to secure and position the switch package and the circuit board within the housing.

24. The input device of claim 22 wherein each of the first and second buttons includes a respective one of first and second actuating members extending within the housing, the switch spring being engaged and flexed by the first and second actuating members in response to the user actuation of the first and second buttons, respectively.

25. The input device of claim 22 wherein each of the first and second buttons includes a respective one of first and second actuating members extending within the housing, and wherein the switch spring includes first and second contact leaves, the first and second actuating members operable to move the first and second contact leaves to make the first and second electrical connections with the first and second contacts, all respectively.

26. The input device of claim 22 wherein the switch spring includes first and second contact leaves respectively positioned near the first and second contacts, and wherein the switch spring includes first and second spring elements respectively biasing the first and second contact leaves away from the first and second contacts.

27. The input device of claim 26 wherein the switch case includes first and second support members, each supporting a free end of a respective one of the spring elements, and wherein the switch case includes first and second restraining members, each restraining displacement of a respective one of the first and second contact leaves.

28. The input device of claim 22 wherein the switch spring includes first and second contact leaves, each being fixed at one end to the switch case.

29. The input device of claim 22, further comprising a transducer positioned within the housing for receiving user commands indicating movement.

* * * * *